US012531319B2

(12) United States Patent
Park et al.

(10) Patent No.: US 12,531,319 B2
(45) Date of Patent: *Jan. 20, 2026

(54) CAVITY FILTER COMPRISING A TERMINAL PORTION HAVING FIRST AND SECOND CONDUCTIVE TERMINALS SLIDABLY INSERTED WITH RESPECT TO EACH OTHER

(71) Applicant: KMW INC., Hwaseong-si (KR)

(72) Inventors: Nam Shin Park, Hwaseong-si (KR); Joung Hoe Kim, Hwaseong-si (KR); Sung Ho Jang, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,458

(22) Filed: May 28, 2024

(65) Prior Publication Data

US 2024/0332766 A1 Oct. 3, 2024

Related U.S. Application Data

(63) Continuation of application No. 17/118,720, filed on Dec. 11, 2020, now Pat. No. 12,027,740, which is a (Continued)

(30) Foreign Application Priority Data

Jun. 12, 2018 (KR) ........................ 10-2018-0067397

(51) Int. Cl.
*H01P 1/04* (2006.01)
*H01P 1/203* (2006.01)
(Continued)

(52) U.S. Cl.
CPC .......... *H01P 1/045* (2013.01); *H01P 1/20309* (2013.01); *H01P 1/207* (2013.01);
(Continued)

(58) Field of Classification Search
CPC ............. H01P 1/045; H01P 5/085; H01P 1/20
(Continued)

(56) References Cited

U.S. PATENT DOCUMENTS 5,329,262 A 7/1994 Fisher, Jr.
5,450,046 A 9/1995 Kosugi et al.
(Continued)

FOREIGN PATENT DOCUMENTS

CN 201018487 Y 2/2008
CN 201230025 Y 4/2009
(Continued)

OTHER PUBLICATIONS

Japanese Office Action mailed on May 28, 2024 from the Japanese Patent Office for Japanese Application No. 2023-042738.
(Continued)

*Primary Examiner* — Benny T Lee
(74) *Attorney, Agent, or Firm* — Insight Law Group, PLLC; Seung Lee

(57) ABSTRACT

The present invention relates to a cavity filter. The cavity filter includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion is divided into a first side terminal contacted with the electrode pad and a second side terminal connected to the RF signal connecting portion, absorbs the assembly tolerance existing in a terminal insertion port, in which the terminal portion is provided, through an elastic member provided between the
(Continued)

first side terminal and the second side terminal, and prevents disconnection of an electric flow, thereby preventing degradation in performance of an antenna device.

20 Claims, 28 Drawing Sheets

Related U.S. Application Data continuation of application No. PCT/KR2019/007080, filed on Jun. 12, 2019.

(51) Int. Cl.
*H01P 1/207* (2006.01)
*H01P 1/208* (2006.01)
*H01P 7/06* (2006.01)

(52) U.S. Cl.
CPC .......... *H01P 1/2084* (2013.01); *H01P 1/2088* (2013.01); *H01P 7/065* (2013.01)

(58) Field of Classification Search
USPC .................................................. 333/202, 260
See application file for complete search history.

(56) References Cited

U.S. PATENT DOCUMENTS

| | | | | |
|---|---|---|---|---|
| 5,576,675 | A | 11/1996 | Oldfield | |
| 6,166,615 | A | 12/2000 | Winslow et al. | |
| 6,236,287 | B1 | 5/2001 | Quan et al. | |
| 6,699,054 | B1 | 3/2004 | Critelli | |
| 12,027,740 | B2 * | 7/2024 | Park et al. | H01P 7/065 |
| 2010/0124848 | A1 | 5/2010 | Atkinson et al. | |
| 2010/0233903 | A1 | 9/2010 | Islam | |
| 2013/0052839 | A1 | 2/2013 | Iwama | |
| 2018/0131153 | A1 | 5/2018 | Flaherty, IV | |
| 2021/0098849 | A1 | 4/2021 | Park et al. | |
| 2021/0098851 | A1 | 4/2021 | Park et al. | |
| 2021/0234245 | A1 | 7/2021 | Kim et al. | |

FOREIGN PATENT DOCUMENTS

| | | | |
|---|---|---|---|
| CN | 201294286 | | 8/2009 |
| CN | 106057771 | A | 10/2016 |
| CN | 206789830 | U | 12/2017 |
| JP | S60123666 | U | 8/1985 |
| JP | 2003-078078 | A | 3/2003 |
| JP | 2003078078 | | 3/2003 |
| JP | 2007-006529 | A | 1/2007 |
| JP | 2007281834 | A | 10/2007 |
| JP | 2009-266470 | A | 11/2009 |
| JP | 2009302603 | A | 12/2009 |
| JP | 2014-072042 | A | 4/2014 |
| JP | 2019-536362 | A | 12/2019 |
| KR | 20110041919 | A | 4/2011 |
| KR | 20160119942 | A | 10/2016 |
| KR | 20180055772 | A | 5/2018 |
| WO | 2015131600 | A1 | 9/2015 |
| WO | 2018093176 | A2 | 5/2018 |

OTHER PUBLICATIONS

International Search Report for PCT/KR2019/007080 mailed on Sep. 18, 2019 and its English abstract.
Chinese office action mailed on Aug. 9, 2021 from the Chinese Patent Office for Chinese Application No. 20190039611.8.
Japanese office action mailed on Feb. 1, 2022 for Japanese Application No. 2020-568966.
Extended European Search Report mailed on May 25, 2022 for European Application No. 19819519.0.
Japanese office action mailed on Aug. 9, 2022 for Japanese Application No. 2020-568966.
Extended European Search Report mailed on Mar. 7, 2024 from the European Patent Office for European Application No. 19819519.0.
Non-final Office Action mailed on May 12, 2022 from the USPTO for U.S. Appl. No. 17/118,720.
Non-final Office Action mailed on Nov. 17, 2022 from the USPTO for U.S. Appl. No. 17/118,720.
Notice of Non-compliant Amendment mailed on Jun. 21, 2023 from the USPTO for U.S. Appl. No. 17/118,720.
Final Office Action mailed on Sep. 14, 2023 from the USPTO for U.S. Appl. No. 17/118,720.
Notice of Allowance mailed on Feb. 7, 2024 from the USPTO for U.S. Appl. No. 17/118,720.
Notice of Allowance mailed on May 22, 2024 from the USPTO for U.S. Appl. No. 17/118,720.

* cited by examiner

10

CAVITY FILTER COMPRISING A TERMINAL PORTION HAVING FIRST AND SECOND CONDUCTIVE TERMINALS SLIDABLY INSERTED WITH RESPECT TO EACH OTHER

CROSS-REFERENCE TO RELATED APPLICATIONS

This application is a Continuation Application of U.S. application Ser. No. 17/118,720, filed on Dec. 11, 2020 (now U.S. Pat. No. 12,027,740, issued on Jul. 2, 2024), which is a Continuation Application of International Application No. PCT/KR2019/007080, filed on Jun. 12, 2019, which claims priority and benefits of Korean Application Nos. 10-2018-0067397, filed on Jun. 12, 2018, and 10-2019-0069124, filed on Jun. 12, 2019, the disclosures of which are incorporated herein by reference in their entirety.

TECHNICAL FIELD

The present invention relates to a cavity filter and a connecting structure included therein, and more particularly, to a cavity filter for a massive MIMO (Multiple-Input Multiple-Output) antenna, which improves a connector fastening structure between a filter and a PCB (Printed Circuit Board) in consideration of assembly performance and size, and a connecting structure included therein.

BACKGROUND ART

The contents described in this section simply provide background information on the present disclosure, and do not constitute the related art.

MIMO (Multiple Input Multiple Output) refers to a technology capable of significantly increasing a data transmission capacity by using a plurality of antennas, and is a spatial multiplexing technique in which a transmitter transmits different data through respective transmitting antennas and a receiver sorts the transmitted data through a suitable signal processing operation. Therefore, when the number of transmitting antennas and the number of receiving antennas are increased at the same time, the channel capacity may be raised to transmit more data. For example, when the number of antennas is increased to 10, it is possible to secure a channel capacity ten times larger than in a current single antenna system, even though the same frequency band is used.

In the 4G LTE-advanced technology, 8 antennas are used. According to the current pre-5G technology, a product having 64 or 128 antennas mounted therein is being developed. When the 5G technology is commercialized, it is expected that base station equipments with a larger number of antennas will be used. This technology is referred to as "massive MIMO". Currently, cells are operated in a 2D manner. However, when the massive MIMO technology is introduced, 3D-beamforming becomes possible. Thus, the massive MIMO technology is also referred to as "FD (Full Dimension)-MIMO".

According to the massive MIMO technology, the numbers of transceivers and filters are increased with the increase in the number of antennas. As of 2014, 200,000 or more base stations are installed in Korea. That is, there is a need for a cavity filter structure which is easily mounted while minimizing a mounting space. Furthermore, there is a need for an RF signal line connecting structure which provides the same filter characteristic even after individually tuned cavity filters are mounted in antennas.

An RF filter having a cavity structure includes a resonator provided in a box structure formed of a metallic conductor, the resonator being configured as a resonant bar or the like. Thus, the RF filter has only a natural frequency of an electromagnetic field to transmit only a specific frequency, e.g. an ultra-high frequency, through resonance. A band pass filter with such a cavity structure has a low insertion loss and high power. Thus, the band pass filter is utilized in various manners as a filter for a mobile communication base station antenna.

SUMMARY OF THE INVENTION

Technical Problem

An object of the present invention is to provide a cavity filter which has a slimmer and more compact structure and includes an RF connector embedded in a filter body in a thickness direction thereof, and a connecting structure included therein.

Another object of the present invention is to provide a cavity filter which is assembled through an assembly method capable of minimizing an accumulated assembly tolerance which occurs when a plurality of filters are assembled, and has an RF signal connection structure that can implement easier mounting and uniformly maintain the frequency characteristics of the filters, and a connecting structure included therein.

Still another object of the present disclosure is to provide a cavity filter which can prevent a signal loss by applying a lateral tension, while allowing a relative motion in the case of a separable RF pin, and a connecting structure therein.

Yet another object of the present disclosure is to provide a cavity maintain a constant contact area between two members to be electrically connected to each other, while absorbing assembly tolerance between the two members, and be installed through a straightforward and simple method, and a connecting structure included therein.

The technical problems of the present disclosure are not limited to the above-described technical problems, and other technical problems which are not mentioned can be clearly understood by the person skilled in the art from the following descriptions.

Technical Solution

In one general aspect, a cavity filter includes: an connecting portion spaced apart, by a RF signal predetermined distance, from an external device having an electrode pad provided on a surface thereof; and a terminal portion provided in a terminal insertion port and is configured to electrically connect the electrode pad of the external device and the RF signal connecting portion; and a dielectric body provided in the terminal insertion port to surround the terminal portion, wherein the terminal portion comprises a first terminal which is in contact with the electrode pad, a second terminal connected to the RF signal connecting portion, and an elastic member provided between the first terminal and the second terminal, wherein the dielectric body surrounds at least a part of the first terminal and at least a part of the second terminal.

The dielectric body comprises an upper portion, in a cylindrical shape, having a first diameter and a lower portion in a cylindrical shape, having a second diameter, and the first diameter is larger than the second diameter.

The first terminal of the terminal portion may be disposed in the terminal insertion port and moved with the dielectric body by an assembly force provided by an assembler, the second terminal of the terminal portion may be connected to the RF signal connecting portion, and any one of the first terminal and the second terminal may be housed in the other so as to overlap the other by a predetermined length.

Any one of the first terminal and the second terminal may have a plurality of tension cut portions elongated in a downward direction.

The tension cut portions may be provided in the first terminal, and an upper end portion of the second terminal may be housed in a lower end portion of the first terminal.

The tension cut portions may be provided in the second terminal, and a lower end portion of the first terminal may be housed in an upper end portion of the second terminal.

The dielectric body may support the outer circumferential surface of the first terminal or the second terminal having the plurality of tension cut portions formed therein.

The cavity filter may further include a reinforcement plate configured to reinforce the RF signal connecting portion provided in the terminal insertion port.

The reinforcement plate may be fixed to an insertion slot support portion protruding toward the terminal insertion port, as a part of a filter body.

The reinforcement plate may have a terminal through-hole through which the terminal portion passes, and any one of the first terminal and the second terminal, which passes through the terminal through-hole, may have a larger diameter than the terminal through-hole so as to be locked to the reinforcement plate.

The second terminal may have an elastic ring installation groove formed on the outer surface thereof, and one or more elastic rings may be positioned in the elastic ring installation groove.

Two or more elastic rings among the one or more elastic rings may be vertically stacked in the elastic ring installation groove.

The elastic member may be provided as an elastic spring which elastically supports the first terminal housed in the second terminal.

The elastic member may be provided as a bar spring including a support ring which is supported by the top surface of the second terminal and a pair of support bars which protrude from the support ring and upwardly inclined in directions crossing each other so as to support the first terminal.

The second terminal of the terminal portion may be soldered and fixed to a solder hole formed in a plate extended from the RF signal connecting portion.

In another general aspect, a connecting structure includes: an RF signal connecting portion spaced apart, by a predetermined distance, from an external device having an electrode pad provided on a surface thereof; and a terminal portion configured to electrically connect the electrode pad of the external device and the RF signal connecting portion so as to absorb assembly tolerance existing at the predetermined distance and to prevent disruption of the electric flow between the electrode pad and the RF signal connecting portion, wherein the terminal portion comprises a first terminal which is in contact with the electrode pad and the second terminal connected to the RF signal connecting portion, and absorbs an assembly tolerance existing terminal insertion port, in which the terminal portion is provided, through an elastic member provided between the first terminal and the second terminal.

Advantageous Effects

In accordance with the embodiments of the present disclosure, the cavity filter may have a slimmer and more compact structure because the RF connector is embedded in the filter body in the thickness direction thereof, be assembled through an assembly method capable of minimizing the accumulated assembly tolerance which occurs when a plurality of filters are assembled, facilitate the RF signal connection structure to be easily mounted and uniformly maintain the frequency characteristics of the filters, and provide stable connection by applying a lateral tension while allowing a relative motion, thereby preventing degradation in antenna performance.

BEST MODE FOR CARRYING OUT THE INVENTION

Figure 1:
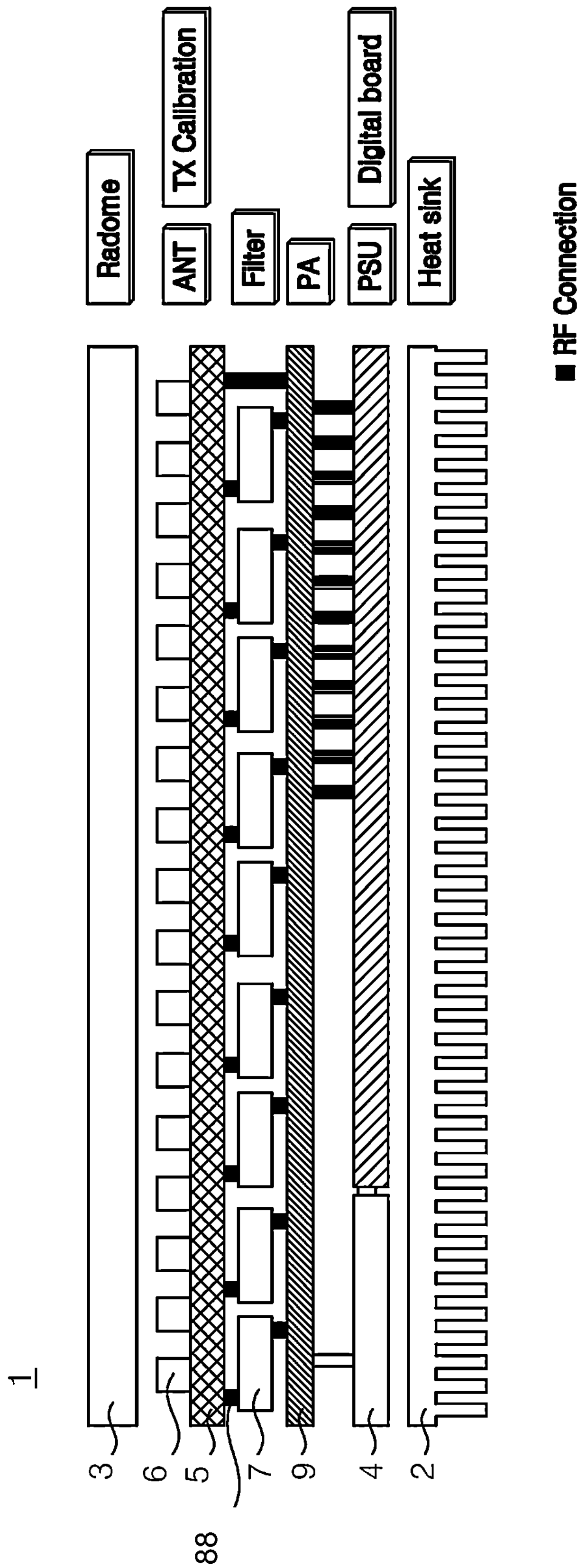
FIG. 1 is a diagram schematically illustrating a stacked structure of a massive MIMO antenna.

Hereafter, some embodiments of the present disclosure will be described in detail with reference to the accompanying drawings. It should be noted that, when components in each of the drawings are denoted by reference numerals, the same components are represented by like reference numerals, even though the components are displayed on different drawings. Furthermore, when it is determined that the detailed descriptions of publicly known components or functions related to the present disclosure disturb understandings of the embodiments of the present disclosure, the detailed descriptions thereof will be omitted herein.

When the components of the embodiments of the present disclosure are described, the terms such as “first”, “second”, “A”, “B”, “(a)” and “(b)” may be used. Each term is only used to distinguish the corresponding component from other components, and the nature or order of the corresponding component is not limited by the term. Furthermore, all terms used herein, which include technical or scientific terms, may have the same meanings as those understood by those skilled in the art to which the present disclosure pertains, as long as the terms are not differently defined. The terms defined in a generally used dictionary should be analyzed to have meanings which coincide with contextual meanings in the related art. As long the terms are not clearly defined in this specification, the terms are not analyzed as ideal or excessively formal meanings.

FIG. 1 is a diagram schematically illustrating a stacked structure of a massive MIMO antenna.

FIG. 1 merely illustrates an exemplary exterior of an antenna device 1 in which an antenna assembly including a cavity filter in accordance with an embodiment of the present disclosure is embedded, and does not limit the exterior of the antenna device 1 when components are actually stacked.

The antenna device 1 includes a housing 2 having a heat sink formed therein and a radome 3 coupled to the housing 2. Between the housing 2 and the radome 3, an antenna assembly may be embedded.

A PSU (Power Supply Unit) 4 is coupled to the bottom of the housing 2 through a docking structure, for example, and provides an operation power for operating communication parts included in the antenna assembly.

Typically, the antenna assembly has a structure in which a number of cavity filters 7 equal to the number of antennas are disposed on a rear surface of an antenna (ANT) board 5 having a plurality of antenna elements 6 arranged on a front surface thereof, and a related PCB 9 is subsequently stacked. The cavity filters 7 may be thoroughly tuned and verified to individually have frequency characteristics suitable for the specification, and prepared before mounted on the antenna board 5. Such a tuning and verifying process may be rapidly performed in an environment with the same characteristics as the mounting state.

Figure 2:
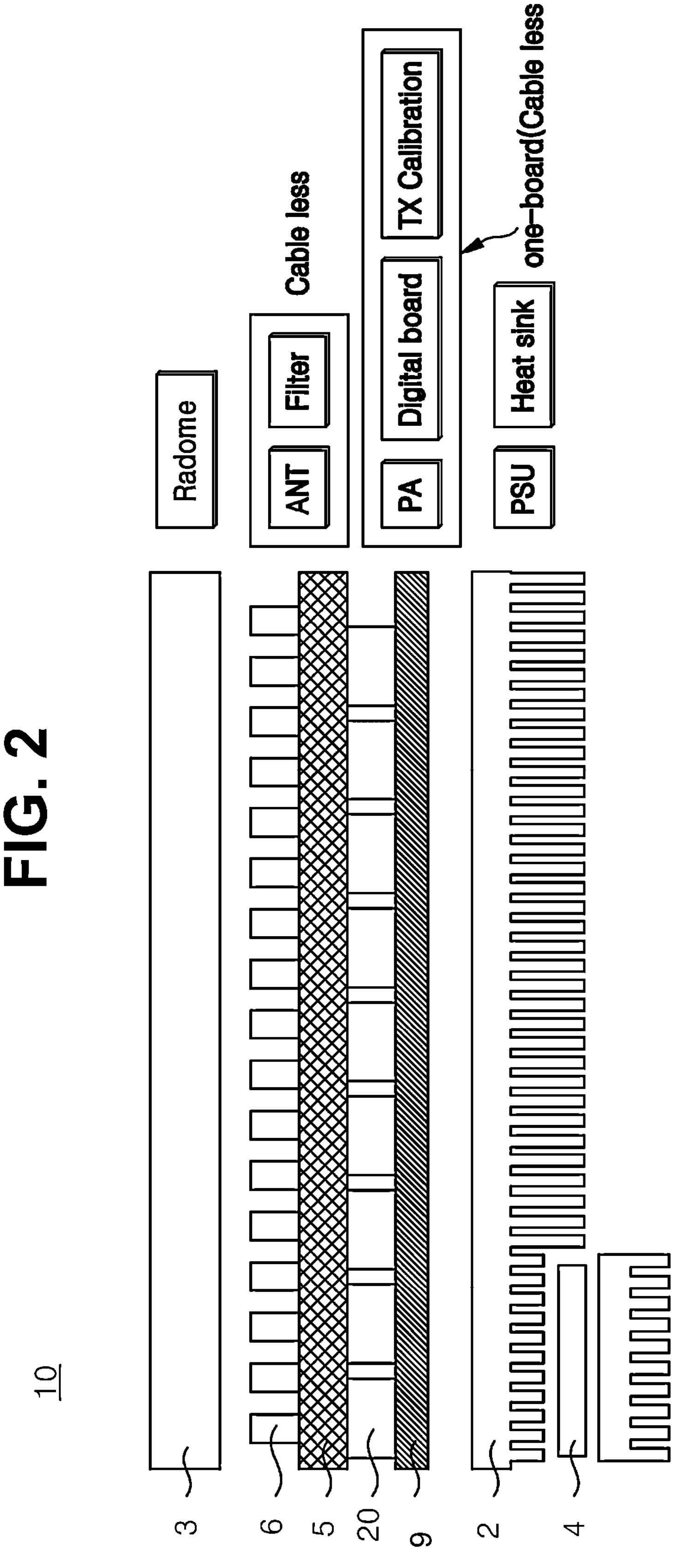
FIG. 2 is a cross-sectional view illustrating that a cavity filter in accordance with an embodiment of the present disclosure is stacked between an antenna board and a control board.

FIG. 2 is a cross-sectional view of an antenna device 10 illustrating that a cavity filter in accordance with an embodiment of the present disclosure is stacked between an antenna board and a control board.

Referring to FIG. 2, a typical RF connector (see reference numeral 88 of FIG. 1) illustrated in FIG. 1 may be excluded, which makes it possible to provide an antenna structure having a lower height profile while facilitating the connection.

Furthermore, an RF connecting portion is disposed on either surface of the cavity filter in the height direction thereof, and connected to the cavity filter 20 in accordance with the embodiment of the present disclosure. Although an external device configured as any one of an antenna board and a PCB board is vibrated or thermally deformed, the RF connection is maintained in a same manner without a change in frequency characteristic.

Figure 3:
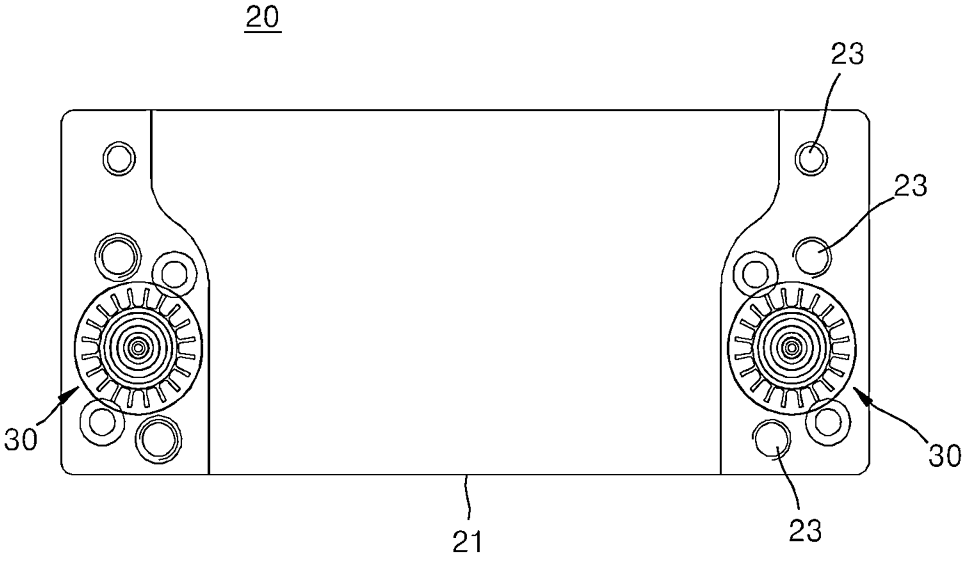
FIG. 3 is a plan perspective view of a structure of the cavity filter in accordance with the embodiment of the present disclosure, when seen from the bottom.

FIG. 3 is a plan perspective view of a structure of the cavity filter in accordance with the embodiment of the present disclosure, when seen from the bottom.

Figure 4:
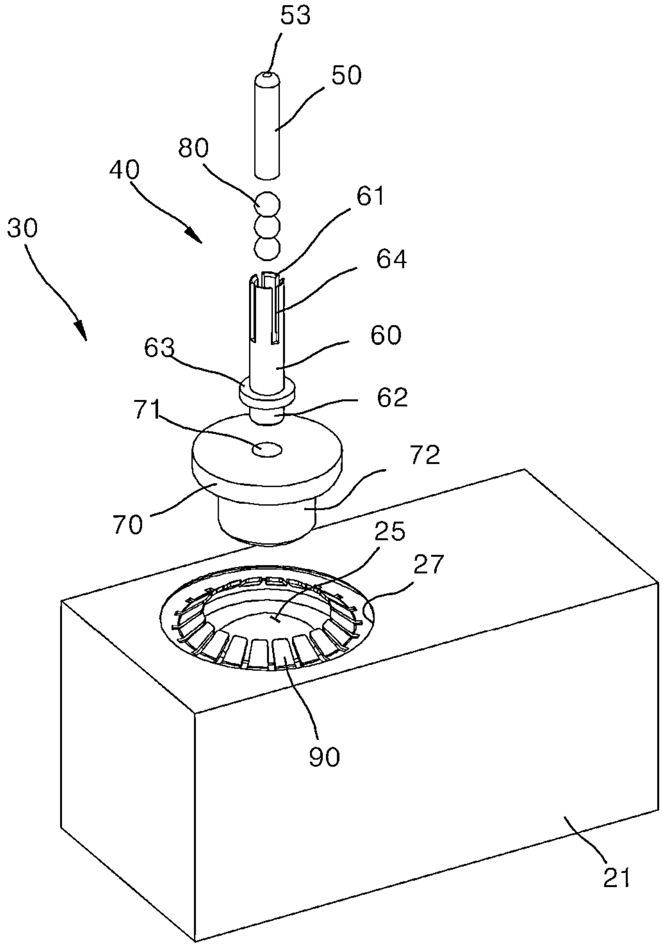
FIG. 4 is an exploded perspective view illustrating some components of a cavity filter in accordance with a first embodiment of the present disclosure.

Referring to FIG. 3, the cavity filter 20 in accordance with the embodiment of the present disclosure includes an RF signal connecting portion 31 (FIG. 5; see reference numeral 31 of FIG. 5 and the following drawings), a first case (with no reference numeral) having a hollow space therein, a second case (with no reference numeral) covering the first case, a terminal portion (refer to the members with reference numerals having ‘40’ at its lowest second digit in FIG. 4 and thereafter) formed on either side of the first case in the longitudinal direction thereof and disposed in the height direction of the cavity filter 20, and a filter module 30 including a plurality of assembly holes 23 formed on both sides of the terminal portion 40. In FIG. 4 and thereafter, the filter module will be represented by ‘30’, regardless of the higher-order digit (i.e., at its lowest second digit) which are used to distinguish among embodiments. The terminal portion 40 electrically connects an electrode pad 52 of the external device 8 (FIG. 5) to the RF signal connecting portion 31 (FIG. 5) through a terminal insertion port 25 (FIG. 4) formed in the first case, the external device 8 being configured as any one of an antenna board and a PCB board.

The integrated or separable configuration of the terminal portion 40 in the cavity filter 20 in accordance with the embodiment of the present disclosure may be implemented as various embodiments depending on a shape for applying a lateral tension and a specific configuration for absorbing an assembly tolerance, as will be described below.

More specifically, the cavity filter 20 may be categorized into an integrated filter and a separable filter. The integrated filter may be formed as a single body in which one end connected to (in contact with) the electrode pad 52 (FIG. 5) of the external device 8, which is provided as any one of an antenna board and a PCB board, is connected to the other end connected to (in contact with) the RF signal connecting portion 31 (FIG. 5), and the separable filter may have a structure in which one end and the other end of the terminal portion 40 are separated from each other at distant locations.

In the case of the integrated filter, the terminal portion 40 is provided as an elastic body which is elastically deformable when a predetermined assembly force is applied, n order to compensate for an assembly tolerance. However, the integrated filter having the terminal portion 40 integrated therewith does not require an additional design for its shape to apply a lateral tension, because an electric flow from one end to the other end thereof is unlikely to be disrupted.

On the contrary, the separable filter additionally includes an elastic member 80 to compensate for an assembly tolerance. Specifically, the whole length of the terminal portion 40 can be decreased while the predetermined assembly force moves a first terminal 50 and a second terminal 60, which are separated from each other, to overlap each other, and restored to the original state when the assembly force is removed. However, since the first terminal 50 and the second terminal 60 of the terminal portion 40 are separated from each other, there is a concern that an electric flow may become disrupted when the first terminal 50 and the second terminal 60 are moved to overlap each other. Therefore, any one of the first terminal 50 and the second terminal 60 may be provided as an elastic body, or an additional design change in shape for applying a lateral tension may be essentially required.

The term 'lateral tension' may be defined as a force which is transferred between any one of the first terminal 50 and the second terminal 60 in a direction different from the longitudinal direction, in order to prevent disruption of the electric flow between the first terminal 50 and the second terminal 60, as described above.

The antenna device is characterized in that, when the design change in shape of the terminal portion 40 is conducted, impedance matching design in the terminal insertion port 25 needs to be performed in parallel with the design change in shape. However, the embodiments of the cavity filter 20 in accordance with the present disclosure will be described under the assumption that impedance matching is completed in the terminal insertion port 25. Among the components of the embodiments of the cavity filter in accordance with the present disclosure, which will be described with reference to FIG. 4 and thereafter, a reinforcement plate or dielectric body inserted into the terminal insertion port 25 with the terminal portion 40 may have various shapes depending on an impedance matching design.

Figure 5:
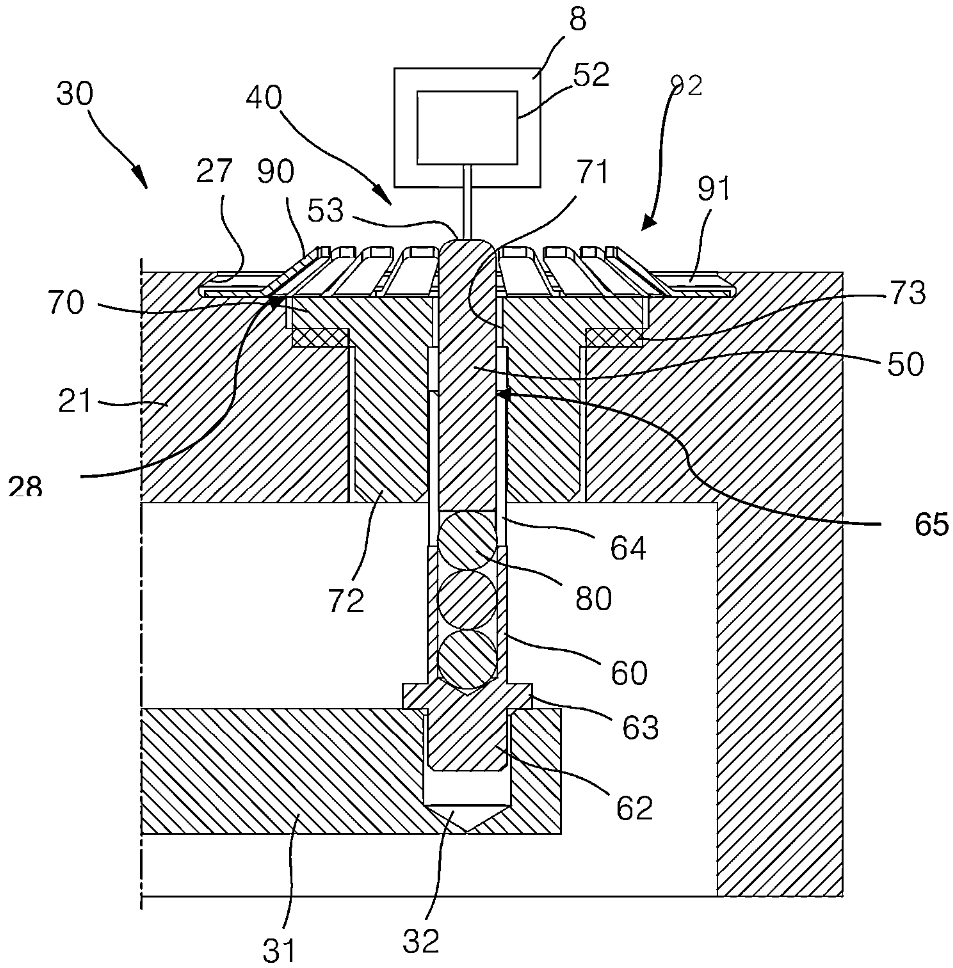
FIG. 5 is a cross-sectional view illustrating the cavity filter in accordance with the first embodiment of the present disclosure.
Figure 6:
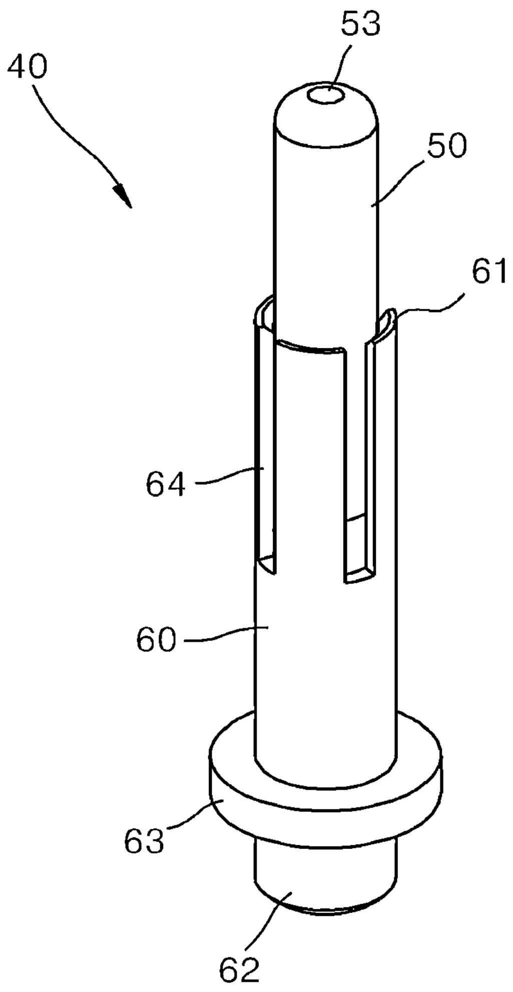
FIG. 6 is a perspective view illustrating a terminal portion among components of FIG. 4.

FIG. 4 is an exploded perspective view illustrating some components of a cavity filter in accordance with a first embodiment of the present disclosure, FIG. 5 is a cross-sectional view illustrating that a terminal portion is inserted and installed into a terminal insertion port among the components of FIG. 4, and FIG. 6 is a perspective view illustrating the terminal portion among the components of FIG. 4.

As illustrated in FIGS. 4 to 6, a cavity filter 30 in accordance with the first embodiment of the present disclosure includes an RF signal connecting portion 31 (FIG. 5) and a terminal portion 40. The RF signal connecting portion 31 (FIG. 5) is spaced part, by a predetermined distance, from an external device having an electrode pad 52 (FIG. 5) provided on one surface thereof. The terminal portion 40 can electrically connect the electrode pad 52 (FIG. 5) of the external device 8 to the RF signal connecting portion 31 (FIG. 5), and not only absorb assembly tolerance existing at the predetermined distance, but also prevent disruption of the electric flow between the electrode pad 52 (FIG. 5) and the RF signal connecting portion 31 (FIG. 5).

As illustrated in FIG. 2, the external device may be any one of an antenna board having antenna elements arranged on the other surface thereof and a PCB board provided as one board on which a PA (Power Amplifier), a digital board and TX calibration are integrated.

Hereafter, as illustrated in FIG. 3, an exterior configuration constituting the embodiments of the cavity filter 20 in accordance with the present disclosure is categorized into first and second cases, but commonly referred to as a filter body 21 having a terminal insertion port 25 (FIGS. 4 and 5) formed therein.

As illustrated in FIGS. 4 and 5, the terminal insertion port 25 of the filter body 21 may be provided as a hollow space as shown in FIG. 4. The terminal insertion port 25 may be formed in different shapes depending on the impedance matching design applied to the plurality of embodiments which will be described below.

The filter body 21 may have a washer installation portion 27 formed as a groove on one surface thereof, on which a first terminal 50 of the terminal portion 40 to be described below is provided. The washer installation portion 27 may be formed as a groove to have a larger inner diameter than the terminal insertion port 25. Thus, the outer edge of a star washer 90 to be described below may be locked to the washer installation portion 27 such that the star washer 90 is prevented from being separated upward.

The cavity filter in accordance with the first embodiment of the present disclosure may further include the star washer 90 fixedly installed on the washer installation portion 27.

The following descriptions will be based on the assumption that the star washer 90 is commonly provided in all the embodiments of the present disclosure, which will be described below, as well as the first embodiment of the present disclosure. Therefore, it should be understood that, although the star washer 90 is not described in detail in the embodiments other than the first embodiment, the star washer 90 may be included in the embodiments.

The star washer 90 may have a fixed edge 91 (FIG. 5) formed in a ring shape and fixed to the washer installation portion 27, and include a plurality of support pieces 92 (FIG. 5) which are upwardly inclined from the fixed edge 91 toward the center of the electrode pad 52 of the external device 8, which is configured as any one of an antenna board and a PCB board.

When the embodiments of the cavity filter in accordance with the present disclosure are assembled to the external device 8 configured as any one of an antenna board and a PCB board by an assembler, the star washer 90 may apply an elastic force in addition to a fastening force by a fastening member (not illustrated) through the above-described assembly hole 23, while the plurality of support pieces 92 (FIG. 5) are supported on one surface of the external device 8 configured as any one of an antenna board and a PCB board.

The application of the elastic force through the plurality of support pieces 92 may make it possible to uniformly maintain a contact area with the electrode pad 52 of the terminal portion 40.

Furthermore, the ring-shaped fixed edge 91 of the star washer 90 may be provided to cover the exterior of the terminal portion 40 which is provided to transfer an electric signal, and serve as a kind of ground terminal.

Furthermore, the star washer 90 serves to compensate for an assembly tolerance existing between multiple external devices 8, each configured as any one of an antenna board and a PCB board, in the embodiments of the cavity filter in accordance with the present disclosure.

As described below, however, the assembly tolerance to be absorbed by the star washer 90 exists in the terminal insertion port 25, and should be distinguished from the assembly tolerance absorbed by the terminal portion 40. That is, the cavity filter in accordance with the embodiments of the present disclosure may be designed to absorb overall assembly tolerances at two or more locations through separate members during a single assembly process, and thus coupled more stably.

As illustrated in FIGS. 4 to 6, the terminal portion 40 in the cavity filter in accordance with the first embodiment of the present disclosure may include the first terminal 50 and the second terminal 60. The first terminal 50 may be in contact with the electrode pad 52 of the external device 8, and the second terminal 60 may have a bottom portion 62 which is fixed to a solder hole 32 (FIG. 5) formed in a portion extended as the RF signal connecting portion 31 (FIG. 5) in a plate shape.

Any one of the first terminal 50 and the second terminal 60 may be inserted into the other, such that parts of end portions of the respective terminals overlap each other by a predetermined length during an assembly process.

The cavity filter in accordance with the first embodiment of the present disclosure may have a structure in which the bottom of the first terminal 50 is inserted into the top of the second terminal 60 in the drawings (see FIGS. 4 to 6). For this structure, an upper end portion 61 (FIGS. 4 and 6) of the second terminal 60 may be provided in a hollow pipe shape such that a lower end portion of the first terminal 50 is partially inserted into the upper end portion 61 (FIGS. 4 and 6) of the second terminal 60.

When the terminal portion 40 provided as the first terminal 50 and the second terminal 60 is installed in the terminal insertion port 25 (FIGS. 4 and 5), a dielectric body 70 (FIGS. 4 and 5) may be inserted to cover the outside of the terminal portion 40 (FIGS. 4 to 6), for impedance matching in the terminal insertion port 25 (FIGS. 4 and 5). The dielectric body 70 (FIGS. 4 and 5) may be formed of Teflon®. However, the material of the dielectric body 70 (FIGS. 4 and 5) is not limited to Teflon®, but can be replaced with material as long as the material has a dielectric constant at which impedance matching in the terminal insertion port can be achieved.

The dielectric body 70 (FIGS. 4 and 5) can be formed as a single body with the first terminal 50 of the terminal portion 40 (FIGS. 4 to 6) through injection molding. However, the dielectric body 70 (FIGS. 4 and 5) may be separately formed to have a terminal through-hole 71 (FIGS. 4 and 5) into which the above-described terminal portion 40 is inserted, and inserted and assembled into the terminal insertion port 25 (FIG. 4). As illustrated in FIG. 5, the dielectric body 70 may be inserted into the terminal insertion port 25 so as to be locked to an insertion slot support portion 28 provided in the terminal insertion port 25.

The smaller the contact area of a contact portion 53 of the first terminal 50, which is in contact with the external device provided as any one of an antenna board and a PCB board, the better. Therefore, as illustrated in FIGS. 4 to 6, the contact portion 53 serving as a leading end of the first terminal 50 may be formed in a hemispherical shape with a predetermined contact area.

When an assembler exerts an assembling force through an operation of bringing the first terminal 50 into contact with the electrode pad 52 of the external device 8 through the contact portion 53 serving as the leading end thereof, the first terminal 50 may be moved in a downward direction (i.e., in a direction toward the solder hole 32) in the drawings, while guided through the terminal through-hole 71 of the dielectric body 70 disposed in the terminal insertion port 25. The first terminal 50 may be provided as a metallic rod through which the current flows.

Furthermore, the upper end portion 61 (FIG. 4) of the second terminal 60, into which the lower end portion of the first terminal 50 is partially inserted, may have a plurality of tension cut portions 64 (FIGS. 4 and 5) elongated in the downward direction. The tension cut portions 64 may be formed to divide the upper end portion 61 (FIG. 4) of the second terminal 60, formed in a hollow pipe shape, into a plurality of portions.

The tension cut portions 64 serve to apply the above-described lateral tension through an operation of pressing the upper end portion 61 (FIG. 4) of the second terminal 60 against the outer circumference of the lower end portion of the first terminal 50 housed in the upper end portion 61 (FIG. 4).

As shown in FIGS. 4 to 6, the second terminal 60 may further comprise a protrusion 63 provided below the tension cut portions 64 and a bottom portion 62 having a smaller diameter than the protrusion 53 provided below the protrusion 63. As shown in FIG. 5, the protrusion 63 may have a diameter larger than the diameter of the solder hole 32 so that the protrusion is supported by an upper edge of the solder hole 32, and the bottom portion 62 of the second terminal 60 may be inserted into the solder hole 32 passing the upper edge of the solder hole 32.

The dielectric body 70 is provided to support the outer circumferential surface of the upper end portion 61 (FIG. 4) of the second terminal 60, where the tension cut portions 64 are formed, toward the inside. Thus, the inner surfaces of the upper end portions 61 (FIG. 4) of the second terminal 60, divided by the tension cut portions 64, are constantly in contact with the outer circumferential surface of the first t terminal 50 housed in the second terminal 60.

As shown in FIG. 5, the dielectric body 70 may comprise an upper portion 73 having a first diameter, and a lower portion 72 having a second diameter. The first diameter may be larger than the second diameter so that a bottom surface of a protruded portion of the upper portion 73 may be supported by a stepped portion of the filter body 21.

When the tension cut portions 64 are formed to divide the upper end portion 61 (FIG. 4) of the second terminal 60 in the plurality of portions, the tips of the upper end portions 61 (FIG. 4) of the second terminal 60 may be inclined at a predetermined angle toward the center of the second terminal 60. At this time, the tips of the upper end portions 61 (FIG. 4) of the second terminal 60 may be inclined to have such a size that at least the lower end portion of the first terminal 50 is housed in the upper end portions 61 (FIG. 4) of the second terminal 60 formed in a hollow pipe shape.

The application of the lateral tension through the tension cut portions 64 may make it possible to prevent disruption of the electric flow between the two separated terminals of the terminal portion 40.

The cavity filter in accordance with the first embodiment of the present disclosure may include one or more elastic members 80 which are disposed in the upper end portion 61 (FIG. 4) of the second terminal 60 formed in a hollow pipe shape and elastically supports the first terminal 50.

In the cavity filter in accordance with the first embodiment of the present disclosure, the one or more elastic members 80 (FIGS. 4 and 5) serve to elastically support the first terminal 50 toward the external device 8 configured as any one of an antenna board and a PCB board, thereby absorbing the assembly tolerance existing in the terminal insertion port 25.

As illustrated in FIGS. 4 to 6, the elastic member 80 may be provided as a plurality of elastic beads which are formed to have a diameter corresponding to the inner diameter of the second terminal 60 formed in a hollow pipe shape, and stacked in the downward direction.

Although not specifically illustrated, when the contact portion 53 serving as the leading end of the first terminal 50 of the terminal portion 40 is closely assembled to the electrode pad 52 of the external device 8, the elastic members 80 are compressed in the upper end portion 61 (FIG. 4) of the second terminal 60 formed in a hollow pipe shape, while absorbing assembly tolerance existing in the terminal insertion port 25 as described above, and then provide an elastic force to continuously bring the contact portion 53 of the first terminal 50 into contact with the electrode pad 52.

As illustrated in FIG. 5, the first terminal 50 may be formed to such a height that the contact portion 53 protrudes further than the support pieces 92 of the star washer 90, when no assembly force is provided by an assembler.

Hereafter, an assembly tolerance absorption process and a lateral tension application process during an assembly process of the cavity filter in accordance with the first embodiment of the present disclosure, which has the above-described configuration, will be described with reference to the accompanying drawings (specifically, FIG. 5).

First, as illustrated in FIG. 5, a predetermined fastening force is transferred to the cavity filter in accordance with the first embodiment of the present disclosure t an operation of bringing the cavity filter into contact with one surface of the external device 8 provided as any one of an antenna board and a PCB board and having an electrode pad provided thereon, and then fastening a fastening member (not illustrated) to an assembly hole 23. However, the cavity filter does not necessarily need to be in contact with one surface of the external device 8 configured as any one of an antenna board and a PCB board. On the contrary, the one surface of the external device configured as any one of an antenna board and a PCB board may be in contact with the cavity filters arranged at predetermined intervals, in order to transfer an assembly force.

Then, as illustrated in FIG. 5, the distance between the external device 8 provided as any one of an antenna board and a PCB board and the cavity filter in accordance with the first embodiment of the present disclosure may be decreased. Simultaneously, the support pieces 92 of the star washer 90 may be deformed by the above-described fastening force to primarily absorb the assembly tolerance existing between the cavity filter in accordance with the first embodiment of the present disclosure and the external device 8 provided as any one of an antenna board and a PCB board.

Simultaneously, the first terminal 50 of the terminal portion 40 is pressed by the one surface of the external device 8 provided as any one of an antenna board and a PCB board, and moved by a predetermined distance toward the second terminal 60 while guided through the terminal through-hole 71 of the dielectric body 70 inserted into the terminal insertion port 25. At this time, the elastic members 80 such as a plurality of elastic beads, which are stacked in the upper end portion 61 (FIG. 4) of the second terminal 60, are compressed to secondarily absorb the assembly tolerance existing in the terminal insertion port 25 of the cavity filter in accordance with the first embodiment of the present disclosure.

Furthermore, since the upper end portion 61 (FIG. 4) of the second terminal 60 applies a lateral tension to the outer circumferential surface of the lower end portion of the first terminal 50, inserted into the second terminal 60 formed in a hollow pipe shape, through the tension cut portions 64, it is possible to prevent disruption of the electric flow between the first terminal 50 and the second terminal 60, thereby preventing degradation in the signal transmission capability of the cavity filter in accordance with the first embodiment of the present disclosure.

Figure 7:
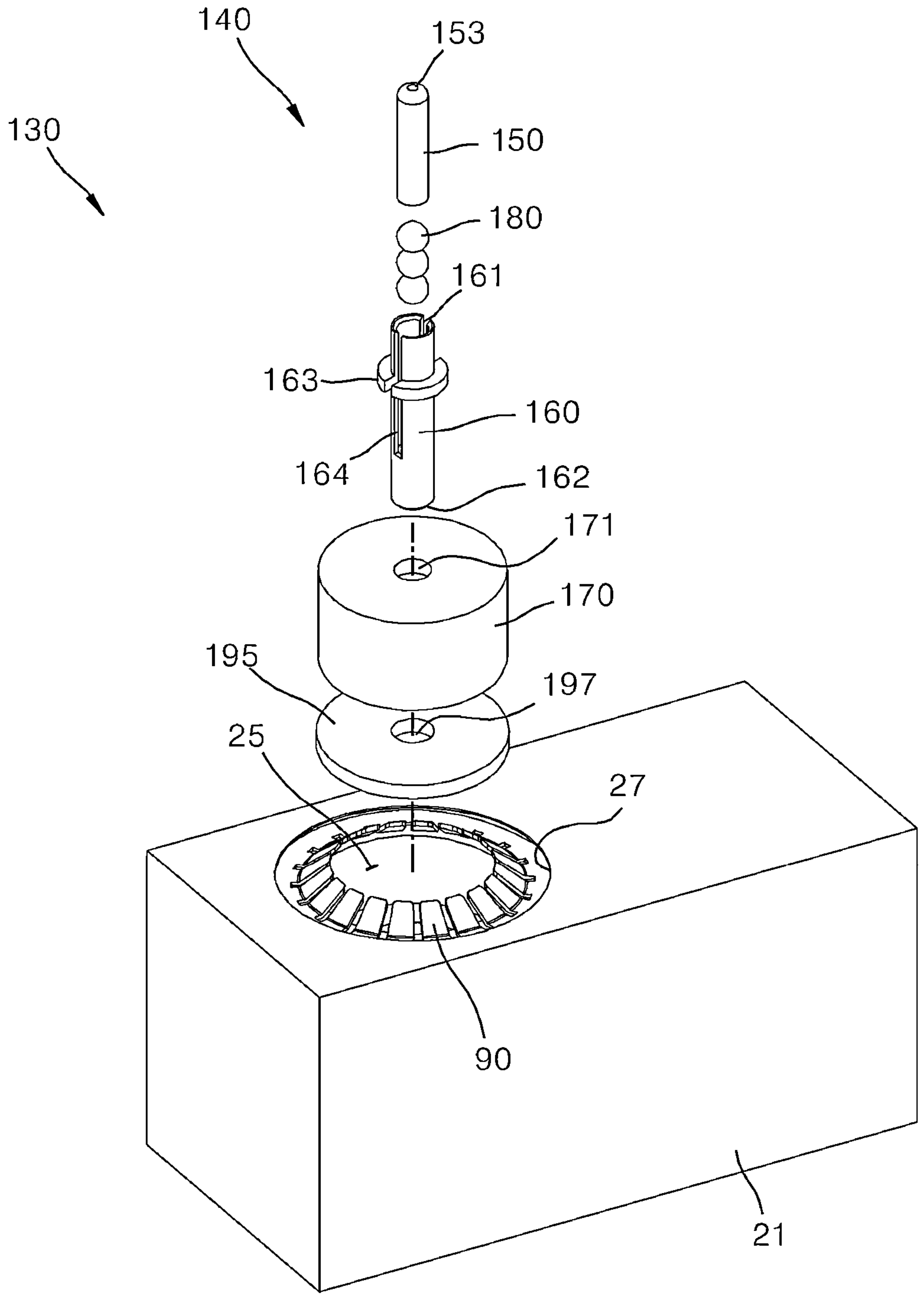
FIG. 7 is an exploded perspective view illustrating a cavity filter in accordance with a second embodiment of the present disclosure.
Figure 8:
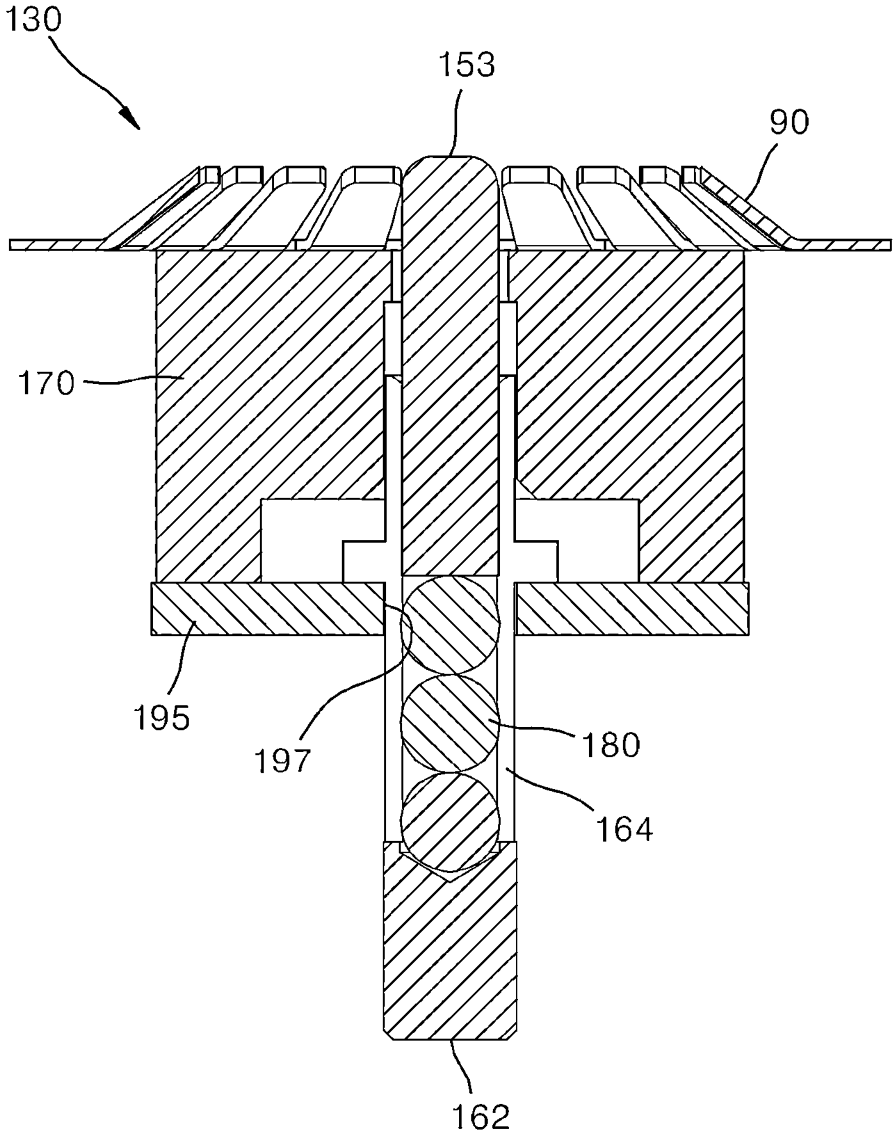
FIG. 8 is a cross-sectional view illustrating the cavity filter in accordance with the second embodiment of the present disclosure.
Figure 9:
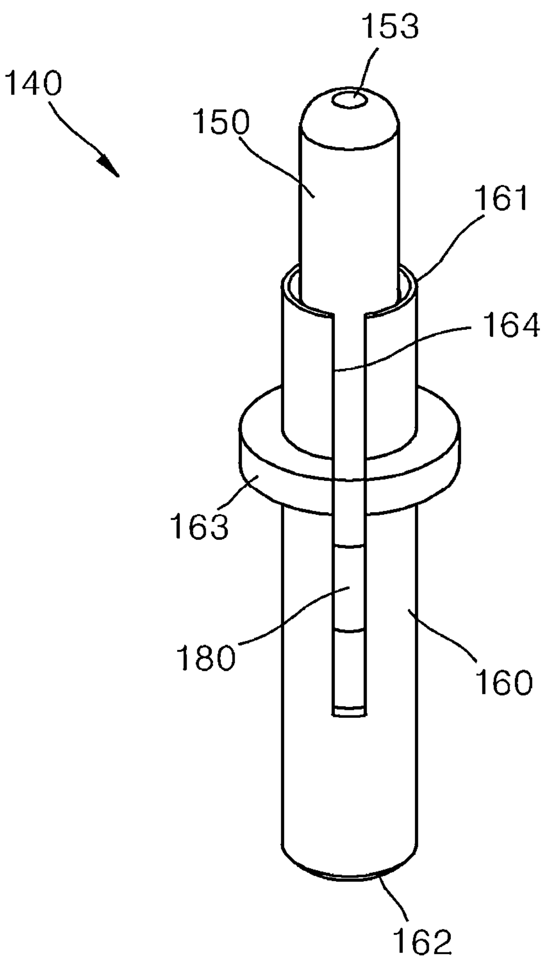
FIG. 9 is a perspective view illustrating a terminal portion among components of FIG. 7.

FIG. 7 is an exploded perspective view illustrating some components of a cavity filter 130 in accordance with a second embodiment of the present disclosure, FIG. 8 is a cross-sectional view illustrating that a terminal portion is inserted and installed into a terminal insertion port among the components of FIG. 7, and FIG. 9 is a perspective view illustrating the terminal portion among the components of FIG. 7.

As illustrated in FIGS. 7 to 9, a cavity filter 130 (FIGS. 7 and 8) in accordance with the second embodiment of the present disclosure includes an RF signal connecting portion (as in the first embodiment, not shown in FIGS. 7 to 9), a terminal portion 140 (FIGS. 7 and 9) including a first terminal 150 (FIGS. 7 and 9) and a second terminal 160 (FIGS. 7 and 9), a dielectric body 170 (FIGS. 7 and 8) inserted into a terminal insertion port 25 (FIG. 7) so as to cover the outside of the terminal portion 140 (FIGS. 7 and 9), and a reinforcement plate 195 (FIGS. 7 and 8) for reinforcing the RF signal connecting portion (not shown).

The RF signal connecting portion (not shown), the terminal portion 140 (FIGS. 7 and 9), the dielectric body 170 (FIGS. 7 and 8) and sub-components thereof are configured in the same manner as those of the cavity filter in accordance with the first embodiment of the present disclosure, which has been already described, unless specifically described below. Thus, the detailed descriptions thereof may be replaced with those of the first embodiment. The following descriptions will be focused on differences from those of the first embodiment.

As illustrated in FIGS. 8 and 9, the reinforcement plate 195 (FIGS. 7 and 8) may have a terminal through-hole 197 (FIGS. 7 and 8) through which the second terminal 160 passes, and the second terminal 160 (FIGS. 7 and 9) may be fixed to the terminal through-hole 197 (FIGS. 7 and 8) of the reinforcement plate 195 (FIGS. 7 and 8). The second terminal 160 (FIGS. 7 to 9) may have a locking end 163 (FIG. 9) which has a larger diameter than the terminal through-hole 197 (FIGS. 7 to 9) so as to be locked to the top surface of the reinforcement plate 195 (FIGS. 7 and 8) through the terminal through-hole 197 (FIGS. 7 and 8) of the reinforcement plate 195 (FIGS. 7 and 8).

Although not illustrated, the bottom surface of the edge of the reinforcement plate 195 may be supported by an insertion slot support portion formed in the terminal insertion port 25 (similar to the insertion slot support portion 28 shown in FIG. 5).

The reinforcement plate 195 serves to restrict the dielectric body 170 from being moved downward with the first terminal 150 by a frictional force with the first terminal 150 which is moved downward by an assembly force provided by an assembler, thereby reinforcing the dielectric body 170.

Furthermore, the reinforcement plate 195 serves to restrict the downward movement of the second terminal 160 through the locking end 163 (FIGS. 7 and 9), thereby substantially reinforcing the RF signal connecting portion to which a tail end 162 (FIG. 8) of the second terminal 160 is soldered and fixed.

That is, in the cavity filter in accordance with the first embodiment, an assembly force may be transferred to the RF signal connecting portion while the second terminal 160 is moved downward by the first terminal 50 moved by an assembly force. However, the cavity filter 130 in accordance with the second embodiment may serve to indirectly reinforce the RF signal connecting portion by restricting the downward movement of the second terminal 160.

The structure in which the tension cut portions 164 are formed in an upper end portion 161 (FIG. 9) of the second terminal 160, the lower end portion of the first terminal 150 is partially inserted into the upper end portion 161 of the second terminal 160 formed in a hollow pipe shape, and the plurality of elastic beads are provided as the elastic members 180 (FIGS. 7 and 8) between the first terminal 150 and the second terminal 160 is the same as the structure of the first embodiment. Thus, the detailed descriptions thereof will be omitted herein. Also, the component with the reference numerals 153 and 171 perform same or similar functions as those of 53 and 71 of the first embodiment, and the detailed description thereof will be omitted herein.

Figure 10:
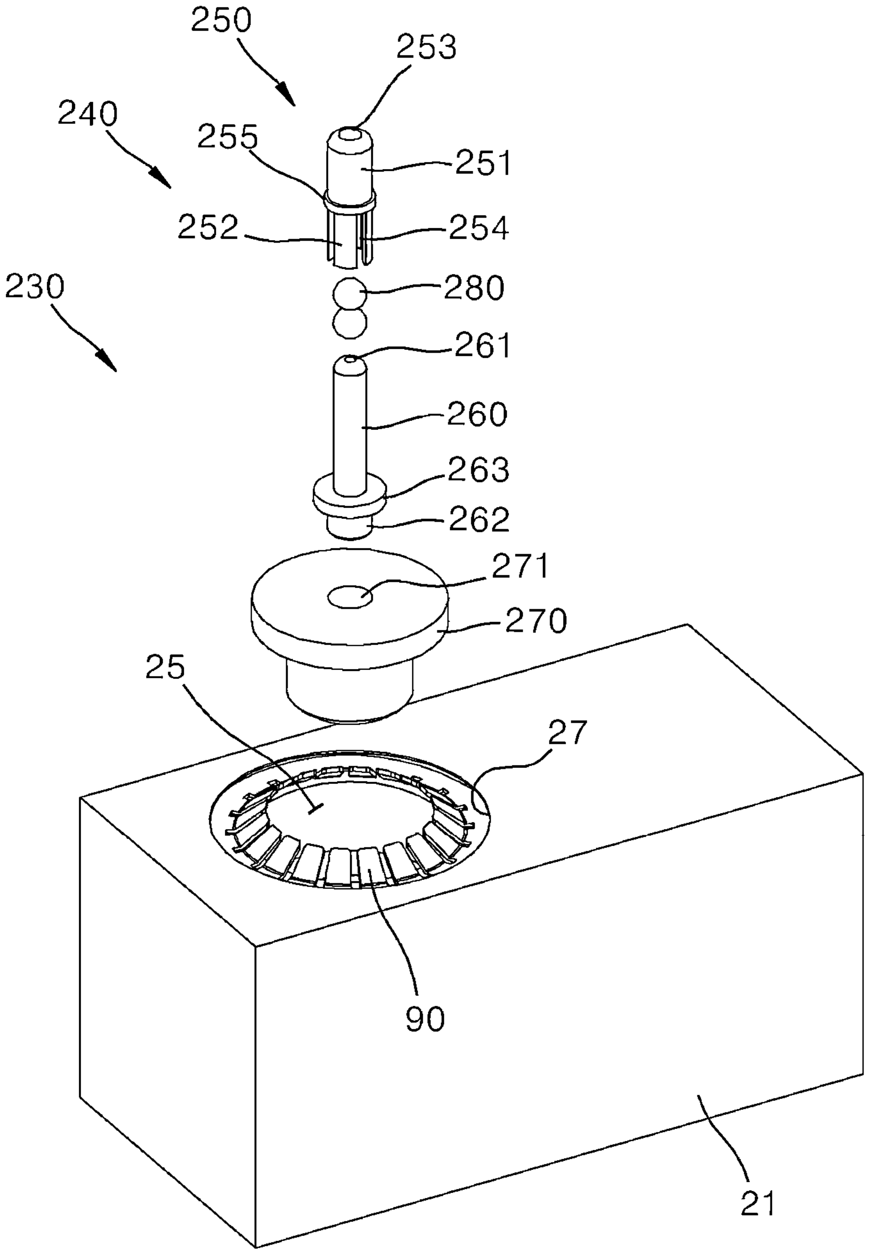
FIG. 10 is an exploded perspective view illustrating a cavity filter in accordance with a third embodiment of the present disclosure.
Figure 11:
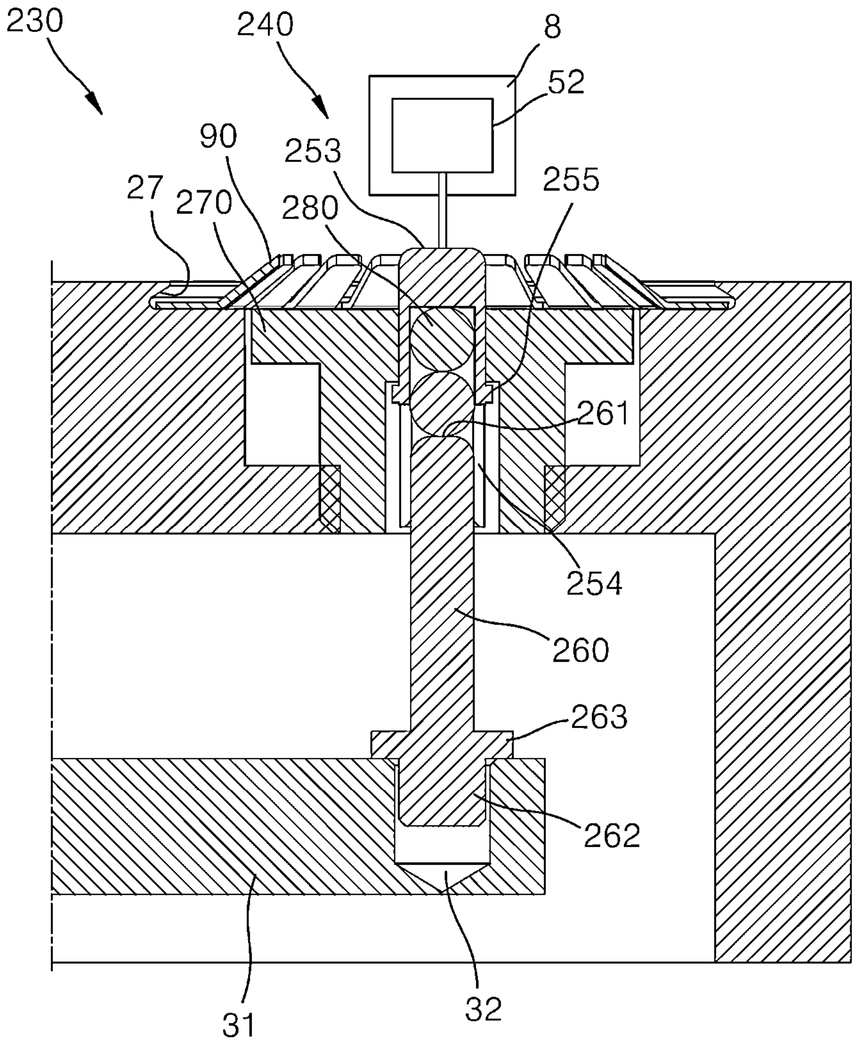
FIG. 11 is a cross-sectional view illustrating the cavity filter in accordance with the third embodiment of the present disclosure.
Figure 12:
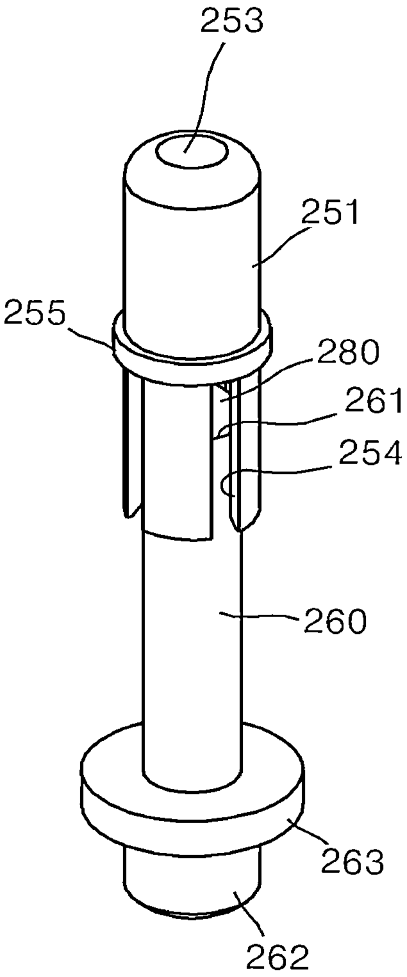
FIG. 12 is a perspective view illustrating a terminal portion among components of FIG. 10.

FIG. 10 is an exploded perspective view illustrating some components of a cavity filter in accordance with a third embodiment of the present disclosure, FIG. 11 is a cross-sectional view illustrating that a terminal portion is inserted and installed into a terminal insertion port among the components of FIG. 10, and FIG. 12 is a perspective view illustrating the terminal portion among the components of FIG. 10.

As illustrated in FIGS. 10 to 12, a cavity filter 230 (FIGS. 10 and 11) in accordance with the third embodiment of the present disclosure includes an RF signal connecting portion 31 (FIG. 11), a terminal portion 240 (FIGS. 10 and 11) and a dielectric body 270 as shown in FIGS. 10 and 11.

Among the components of the cavity filter 230 in accordance with the third embodiment of the present disclosure, the RF signal connecting portion 31 (FIG. 11), the dielectric body 270 and sub components thereof are configured in the same manner as those of the cavity filters in accordance with the first and second embodiments of the present disclosure, which has been already described, unless specifically described below. Thus, the detailed descriptions thereof may be replaced with those of the first and second embodiments.

However, the cavity filter 230 in accordance with the third embodiment of the present disclosure adopts the dielectric body 270 which is configured in the same manner as the dielectric body 70 of the cavity filter in accordance with the first embodiment, but excludes the reinforcement plate 195 among the components of the cavity filter 130 in accordance with the second embodiment.

Among the components of the cavity filter 230 in accordance with the third embodiment of the present disclosure, the terminal portion 240 has a different structure from those of the first and second embodiments in that tension cut portions 254 are formed at a lower end portion 252 (FIG. 10) of first terminal 250 (FIG. 10), and an upper end portion 261 of the second terminal 260 is housed in the lower end portion 252 of the first terminal 250 formed in a hollow pipe shape.

The first terminal 250 may further include a separation prevention rib 255 protruding outwardly from an outer circumferential surface thereof, corresponding to the tops of the tension cut portions 254, to separate the upper end portion 251 and the lower end portion 252 of the first terminal 250.

The separation prevention rib 255 of the first terminal 250 is locked to the inside of a terminal through-hole 271 (FIG. 10) of the dielectric body 270, and prevents the first terminal 250 from being separated to the outside by elastic forces of a plurality of elastic beads 280 interposed between the first terminal 250 and the second terminal 260. The outside indicates the direction in which an external device 8 provided as any one of an antenna board and a PCB board and having an electrode pad provided thereon is provided.

In addition, the cavity filter 230 in accordance with the third embodiment has the same configuration as the cavity filter in accordance with the first embodiment in that the dielectric body 270 supports the outer surfaces of the tension cut portions 254 of the first terminal 250, and a lower end portion 262 of the second terminal 260 is directly soldered and fixed to the RF signal connecting portion 31 without a separate reinforcement plate. Also, the component with the reference numerals 251, 253 and 263 perform same or similar functions as those of 150, 153 and 163 of the first embodiment, and the detailed description thereof will be omitted herein.

Figure 13:
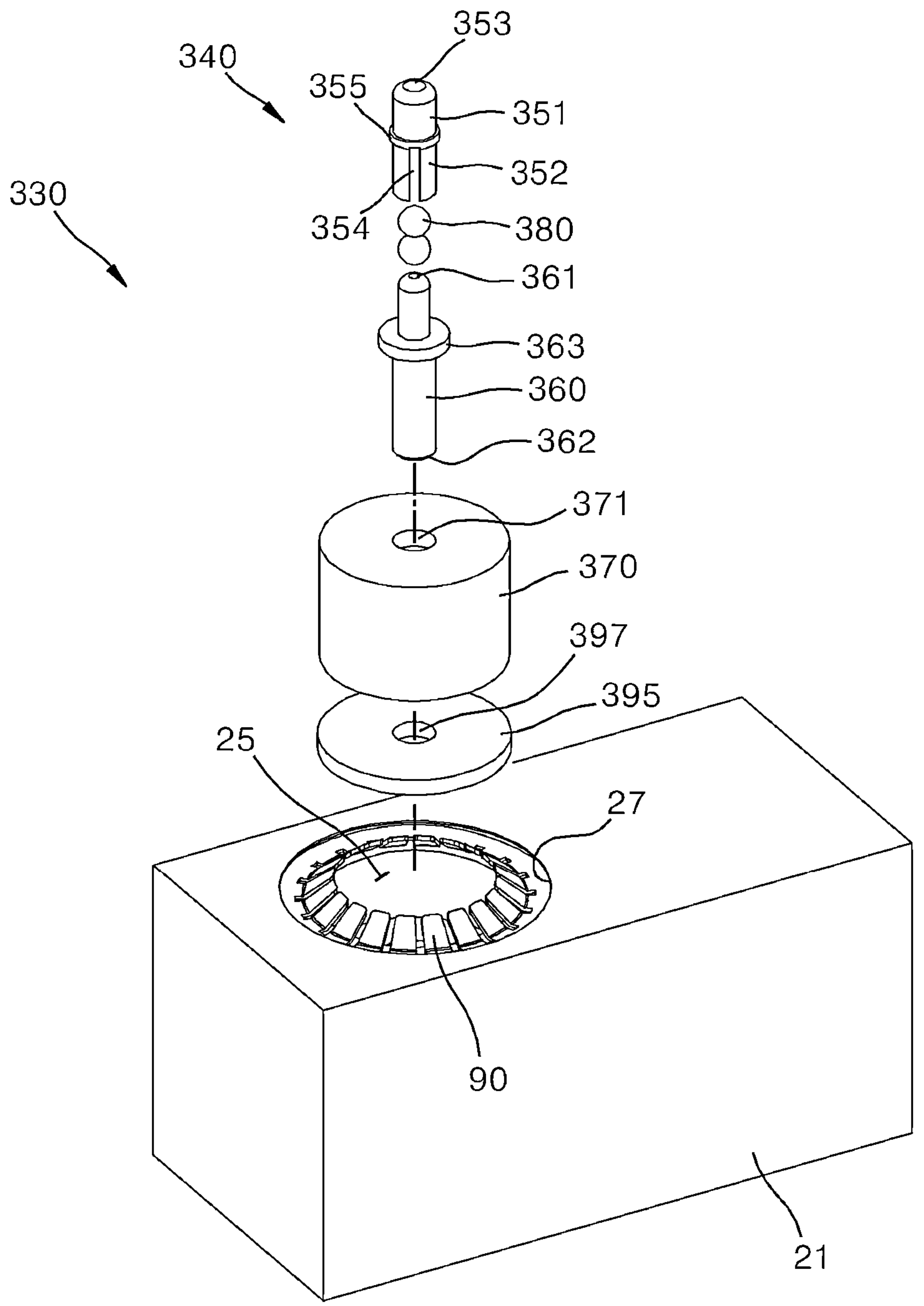
FIG. 13 is an exploded perspective view illustrating a cavity filter in accordance with a fourth embodiment of the present disclosure.
Figure 14:
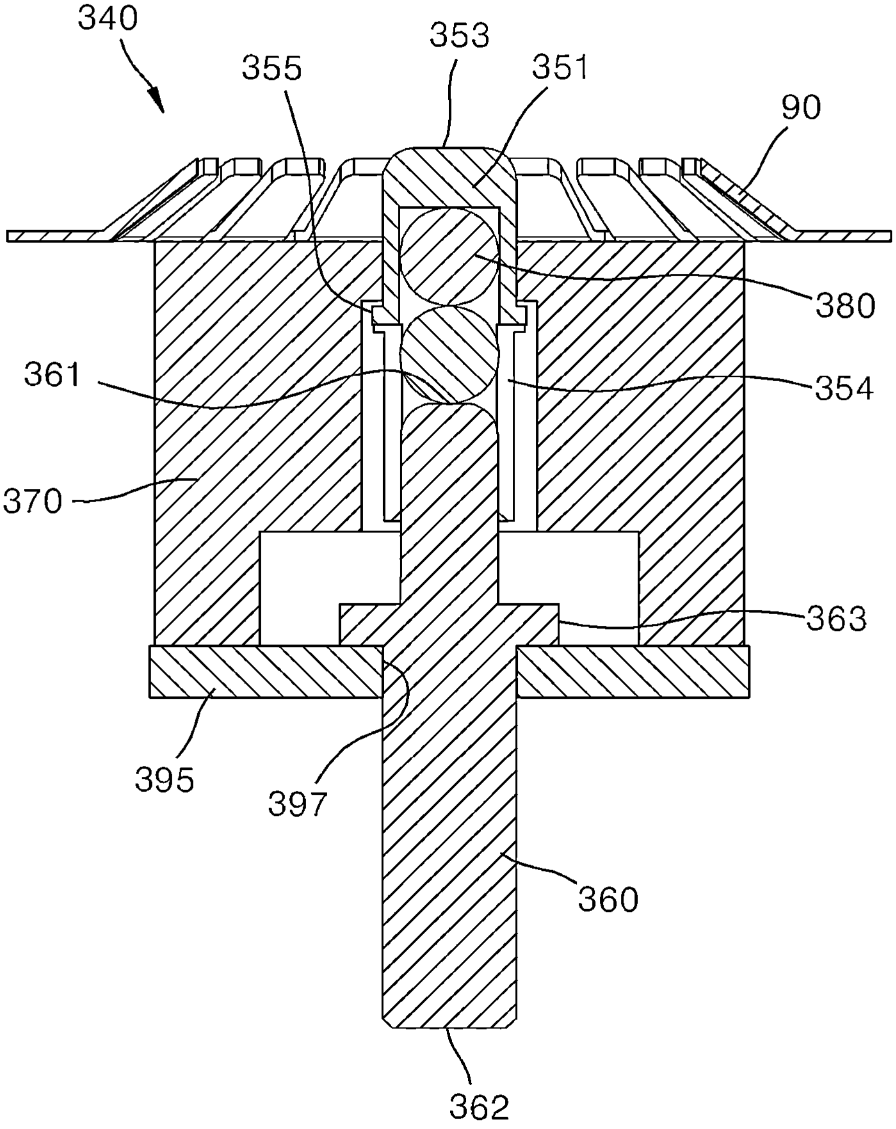
FIG. 14 is a cross-sectional view illustrating the cavity filter in accordance with the fourth embodiment of the present disclosure.
Figure 15:
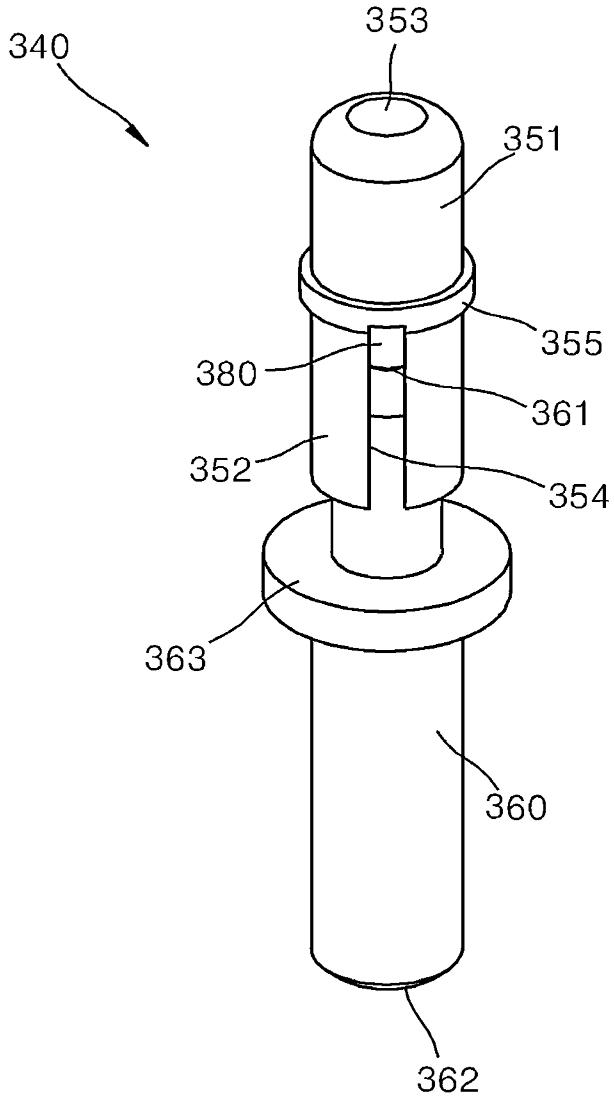
FIG. 15 is a perspective view illustrating a terminal portion among components of FIG. 13.

FIG. 13 is an exploded perspective view illustrating some components of a cavity filter in accordance with a fourth embodiment of the present disclosure, FIG. 14 is a cross-sectional view illustrating that a terminal portion is inserted and installed into a terminal insertion port among the components of FIG. 13, and FIG. 15 is a perspective view illustrating the terminal portion among the components of FIG. 13.

As illustrated in FIGS. 13 to 15, a cavity filter 330 (FIG. 13) in accordance with the fourth embodiment of the present disclosure includes an RF signal connecting portion (as in the first embodiment, not shown in FIGS. 13 to 15), a terminal portion 340 as shown in FIGS. 13 and 14, a dielectric body 370 and a reinforcement plate 395 as shown in FIGS. 13 and 14.

Since the reinforcement plate 395 performs the same function as the reinforcement plate 195 in the cavity filter in accordance with the second embodiment, the detailed descriptions thereof will be omitted herein.

Furthermore, since the terminal portion 340 is configured in the same manner as that of the cavity filter in accordance with the third embodiment, the descriptions thereof may be replaced with those of the third embodiment.

In addition, the cavity filter 330 in accordance with the fourth embodiment may include all the other components of the cavity filter in accordance with the second embodiment.

For example, the components with reference numerals 351, 352, 353, 354, 355, 360, 361, 362, 363, 371, 380 and 397 perform a same or similar functions as those of 251, 252, 253, 254, 255, 260, 261, 262, 263, 271 and 280 of the third embodiment and that of 197 of the second embodiment, respectively, and the detailed descriptions thereof will be omitted herein.

Figure 16:
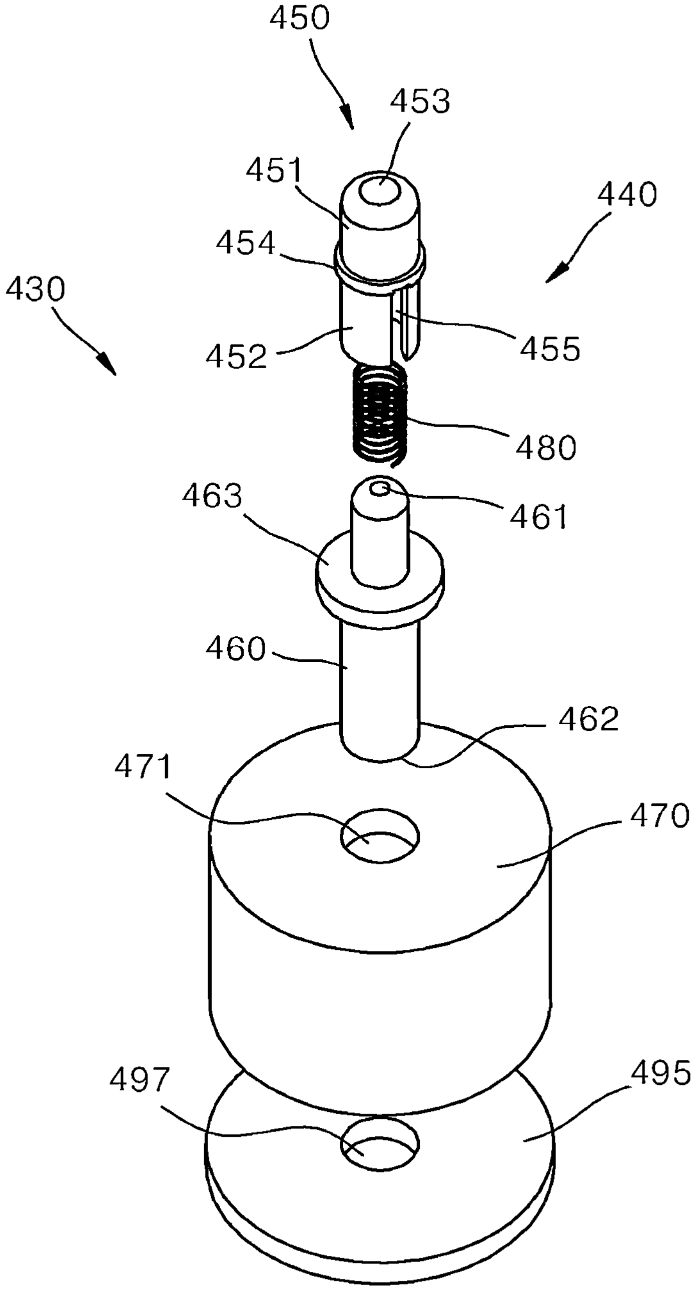
FIG. 16 is an exploded perspective view illustrating a cavity filter in accordance with a fifth embodiment of the present disclosure.
Figure 17:
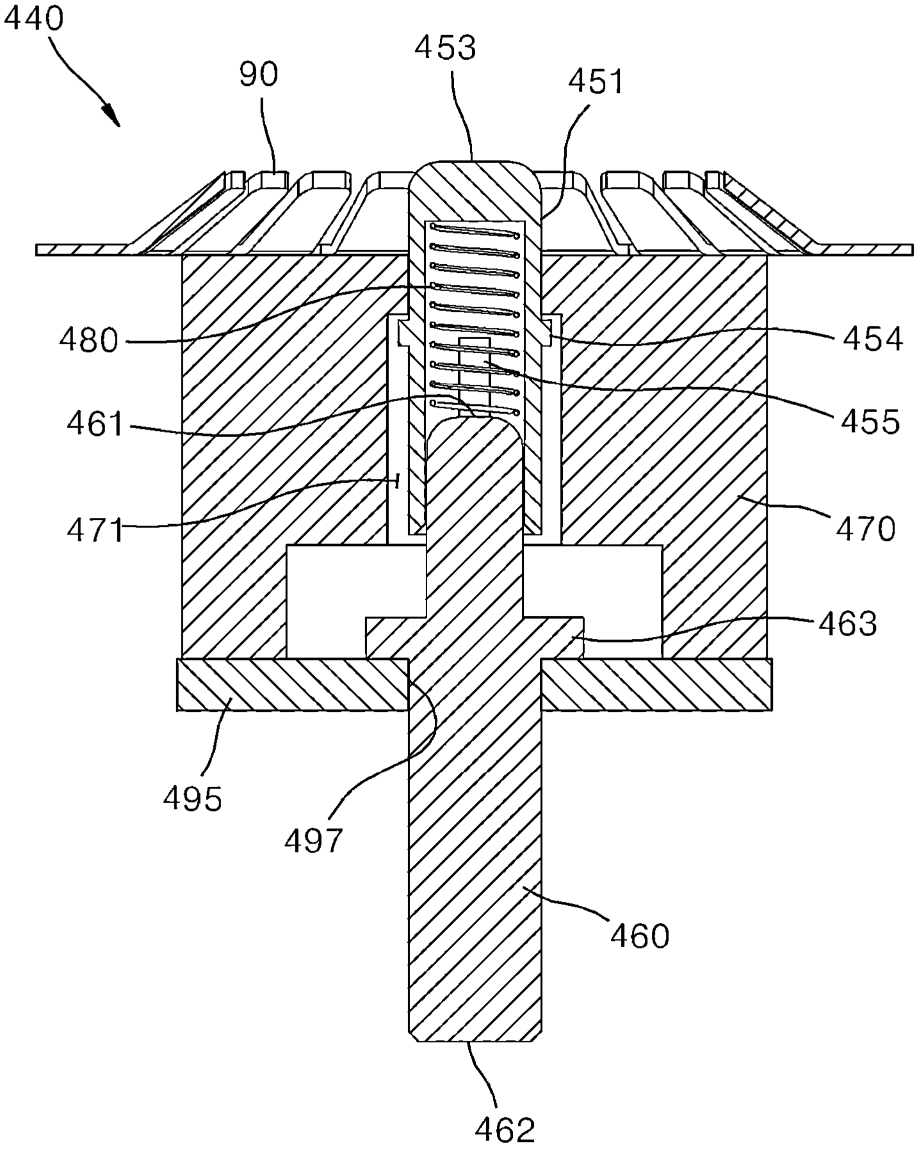
FIG. 17 is a cross-sectional view illustrating the cavity filter in accordance with the fifth embodiment of the present disclosure.
Figure 18:
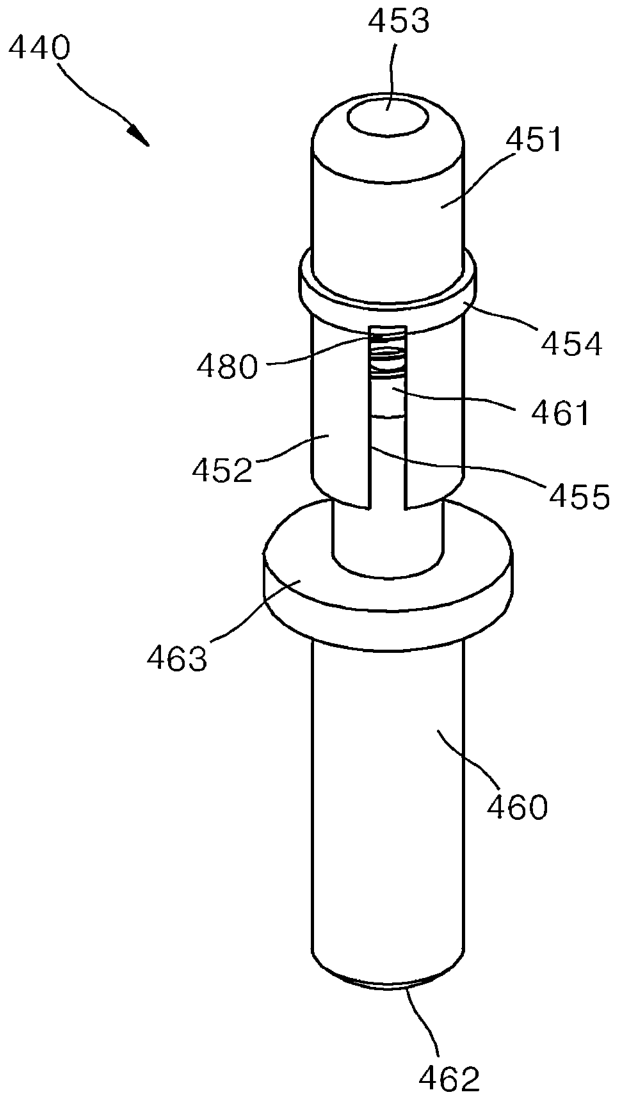
FIG. 18 is a perspective view illustrating a terminal portion among the components of FIG. 16.

FIG. 16 is an exploded perspective view illustrating some components of a cavity filter in accordance with a fifth embodiment of the present disclosure, FIG. 17 is a cross-sectional view illustrating that a terminal portion is inserted and installed into a terminal insertion port among the components of FIG. 16, and FIG. 18 is a perspective view illustrating the terminal portion among the components of FIG. 16.

As illustrated in FIGS. 16 to 18, a cavity filter 430 (FIG. 16) in accordance with the fifth embodiment of the present disclosure includes an RF signal connecting portion (as in the first embodiment, not shown in FIGS. 16 to 18), a terminal portion 440, a dielectric body 470 as shown in FIGS. 16 and 17 and a reinforcement plate 495 as shown in FIGS. 16 and 17.

Since the reinforcement plate 495 performs the same function as the reinforcement plates 195 and 395 in the cavity filters in accordance with the second and fourth embodiments, the detailed descriptions thereof will be omitted herein.

Furthermore, since the terminal portion 440 is configured in the same manner as those of the cavity filters in accordance with the third and fourth embodiments, the descriptions thereof may be replaced with those of the third and fourth embodiments.

As illustrated in FIGS. 16 to 18, however, an elastic member 480 (FIGS. 16 and 17) interposed between a first terminal 450 (FIG. 16) and a second terminal 460 (FIGS. 16 and 17) in the cavity filter in accordance with the fifth embodiment of the present disclosure may be provided as an elastic spring, compared to those of the cavity filters in accordance with the first to fourth embodiments.

In addition, the cavity filter 430 (FIG. 16) in accordance with the fifth embodiment may include all the other components of the cavity filter in accordance with the fourth embodiment.

For example, the components with reference numerals 451, 452, 453, 454, 455, 461, 462, 463, 471, 480 and 497 perform a same or similar functions as those of 251, 252, 253, 254, 255, 261, 262, 263, 271 and 280 of the third embodiment, and that of 197 of the second embodiment, respectively, and the detailed descriptions thereof will be omitted herein.

Figure 19:
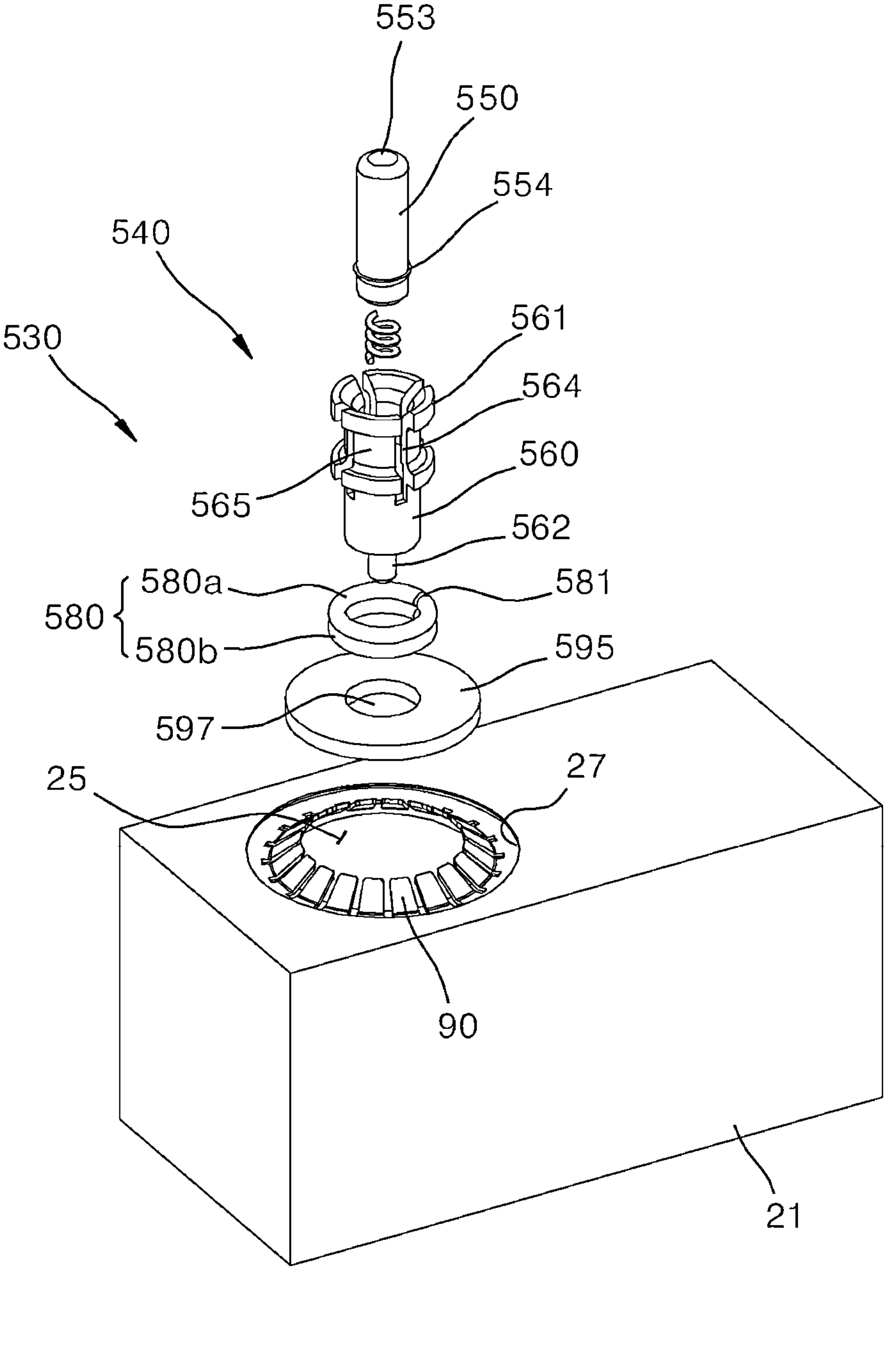
FIG. 19 is an exploded perspective view illustrating a cavity filter in accordance with a sixth embodiment of the present disclosure.
Figure 21:
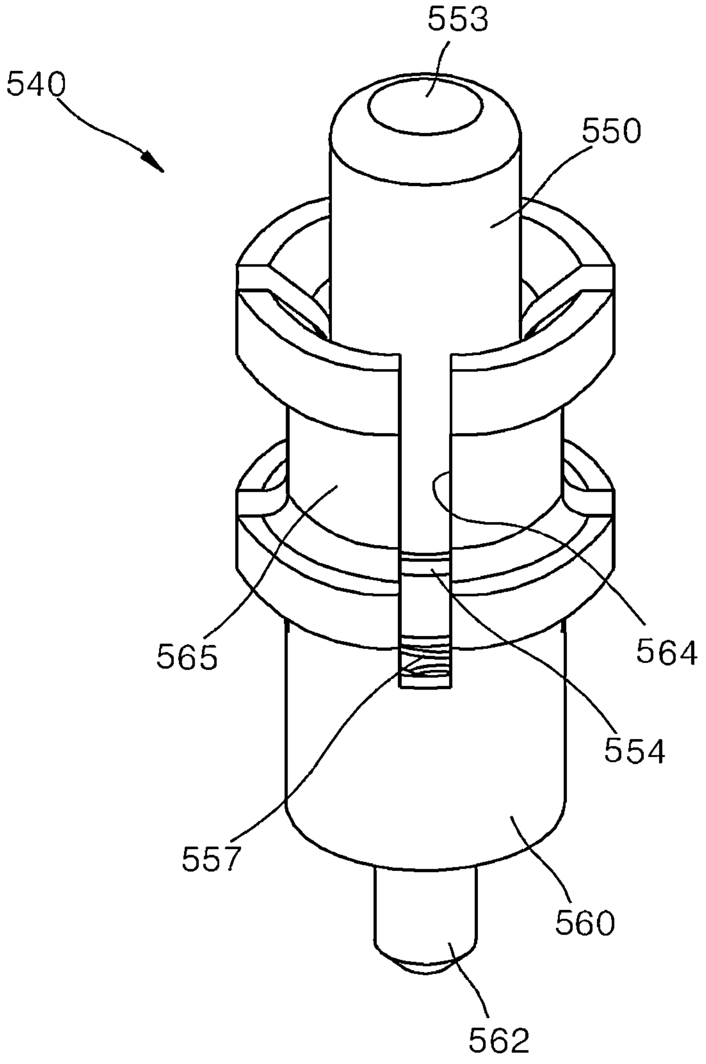
FIG. 21 is a perspective view illustrating a terminal portion among components of FIG. 19.

FIG. 19 is an exploded perspective view illustrating some components of a cavity filter in accordance with a sixth embodiment of the present disclosure, FIG. is a cross-sectional view illustrating that a terminal portion is inserted and installed into a terminal insertion port among the components of FIG. 19, and FIG. 21 is a perspective view illustrating the terminal portion among the components of FIG. 19.

Figure 20:
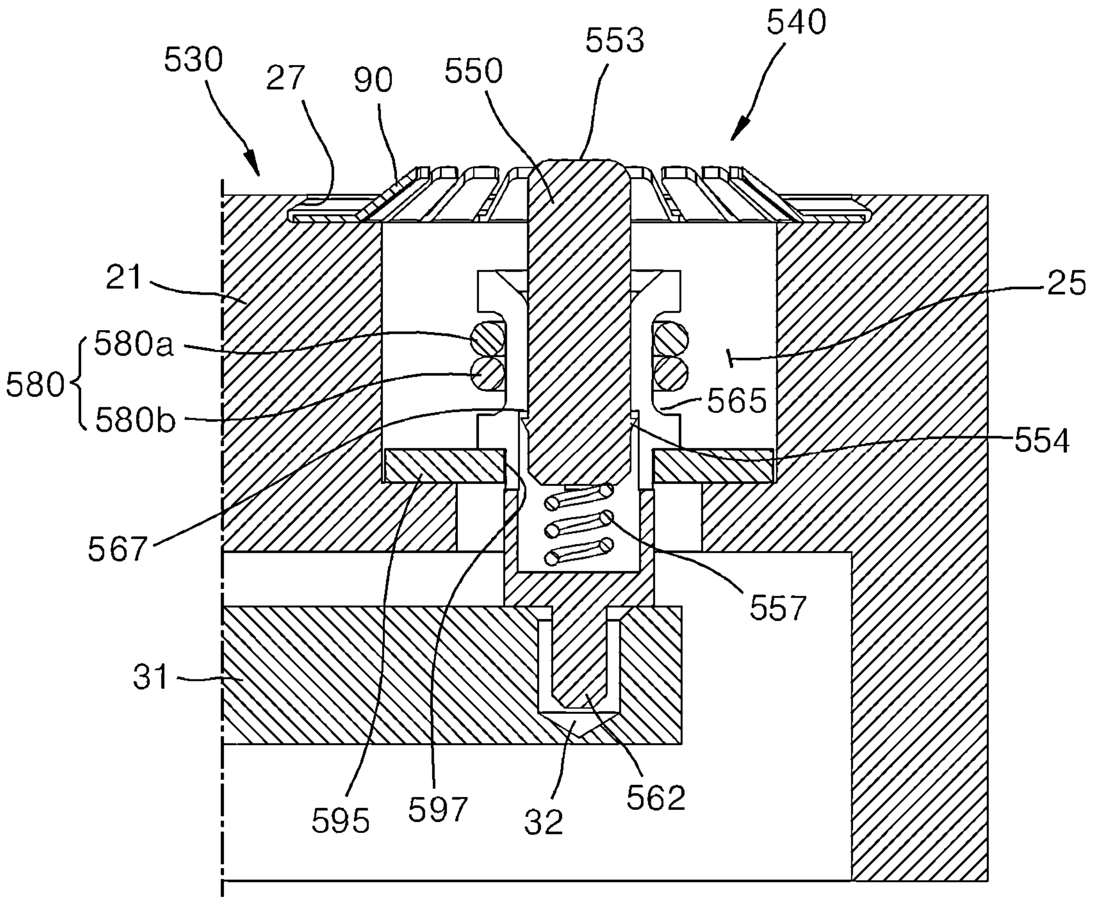
FIG. 20 is a cross-sectional view illustrating the cavity filter in accordance with the sixth embodiment of the present disclosure.

As illustrated in FIGS. 19 to 21, a cavity filter 530 (FIGS. 19 and 20) in accordance with the sixth embodiment of the present disclosure includes an RF signal connecting portion 31 (FIG. 20), a terminal portion 540 (FIGS. 19 to 21) including a first terminal 550 (FIGS. 19 to 21) and a second terminal 560 (FIGS. 19 and 21), and a reinforcement plate 595 (FIGS. 19 and 20).

Among the components of the cavity filter 530 (FIGS. 19 and 20) in accordance with the sixth embodiment of the present disclosure, the RF signal connecting portion 31 (FIG. 20), the terminal portion 540 (FIGS. 19 to 21), the reinforcement plate 595 (FIGS. 19 and 20) and sub-components thereof have the same configurations and functions as those of the cavity filters in accordance with the first to fifth embodiments of the present disclosure, which have been already described, unless specifically described below. Thus, the detailed descriptions thereof may be replaced with those of the first to fifth embodiments.

However, as illustrated in FIGS. 19 to 21, the terminal portion 540 (FIGS. 19 to 21) among the components of the cavity filter 530 (FIGS. 19 and 20) in accordance with the sixth embodiment of the present disclosure has the same configuration as those of the cavity filters (FIG. 3) in accordance with the first and second embodiments. That is, tension cut portions 564 (FIGS. 19 and 21) may be formed in an upper end portion 561 (FIG. 19) of the second terminal 560 (FIGS. 19 and 21), such that a lower end portion of the first terminal 550 (FIGS. 19 to 21) is partially housed in the upper end portion 561 (FIG. 19) of the second terminal 560 (FIGS. 19 and 21) provided as a hollow pipe.

Furthermore, the first terminal 550 (FIGS. 19 to 21) in the cavity filter 530 (FIGS. 19 and 20) in accordance with the sixth embodiment of the present disclosure may be formed in a rod shape which is elongated in the downward direction, and elastically supported by an elastic spring provided as an elastic member 557 (FIGS. 19 and 21) in the second terminal 560 (FIGS. 19 and 21).

Furthermore, the first terminal 550 (FIGS. 19 to 21) may have a locking rib 554 (FIGS. 19 to 21) formed on the outer circumferential surface thereof, the locking rib 554 (FIGS. 19 to 21) being locked to the inside of the second terminal 560 (FIGS. 19 and 21) so as to prevent the first terminal 550 (FIGS. 19 to 21) from being separated to the outside by the elastic member 557 (FIGS. 20 and 21). The locking rib 554 (FIGS. 19 to 21) may be provided as a hook which is not locked when the first terminal 550 (FIGS. 19 to 21) is inserted into the second terminal 560 (FIGS. 19 and 21), but locked to a locking stepped portion 567 (FIG. 20) formed in the second terminal 560 (FIGS. 19 and 21) after the locking rib 554 (FIGS. 19 to 21) is moved past the locking stepped portion 567 (FIG. 20).

In the cavity filter 530 (FIGS. 19 and 20) in accordance with the sixth embodiment of the present disclosure, the second terminal 560 (FIGS. 19 and 21) may have an elastic ring installation groove 565 (FIGS. 19 to 21) formed on the outer circumferential surface thereof, and a plurality of elastic rings 580 (FIGS. 19 and 20) may be vertically stacked in the elastic ring installation groove 565 (FIGS. 19 to 21). In the cavity filter 530 (FIGS. 19 and 20) in accordance with the sixth embodiment of the present disclosure, two elastic rings 580*a* and 580*b* (FIGS. 19 and 20) are vertically stacked as the elastic rings 580 (FIGS. 19 and 20). However, the number of the elastic rings is not limited thereto.

The cavity filter 530 (FIGS. 19 to 21) in accordance with the sixth embodiment of the present disclosure excludes a dielectric body, but applies a lateral tension by pressing the outer circumferential surface of the second terminal 560 (FIGS. 19 and 21) with the tension cut portions 564 (FIGS. 19 and 21) through the elastic rings 580 (FIGS. 19 and 20), thereby preventing disruption of the electric flow between the second terminal 560 (FIGS. 19 and 21) and the outer circumferential surface of the first terminal 550 (FIGS. 19 to 21) moved in the downward direction inside the second terminal 560 (FIGS. 19 and 21).

The cavity filter 530 (FIGS. 19 and 20) in accordance with the sixth embodiment of the present disclosure is supported by an insertion slot support portion 28 (as shown in FIGS. 4 and 5) formed in a terminal insertion port 25, and the reinforcement plate 595 (FIGS. 19 and 20) having a terminal through-hole 597 (FIGS. 19 and 20) through which the second terminal 560 (FIGS. 19 and 21) of the terminal portion 540 (FIGS. 19 to 21) passes serves to reinforce the RF signal connecting portion to which a lower end portion 562 of the second terminal 560 (FIGS. 19 and 21) is soldered and fixed.

As such, in the cavity filter 530 (FIGS. 19 and 20) in accordance with the sixth embodiment of the present disclosure, the elastic member 557 (FIGS. 19 and 21) provided as an elastic spring may be interposed between the first terminal 550 (FIGS. 19 to 21) and the second terminal 560 (FIGS. 19 and 21), and elastically support the first terminal 550 (FIGS. 19 to 21) toward the electrode pad provided on the external device 8 provided as any one of an antenna board and a PCB board in response to an assembly secondarily force provided by an assembler, thereby absorbing assembly tolerance existing in the terminal insertion port 25.

For example, the component with reference numeral 553 performs a same or similar functions as that of reference numeral 53, and the detailed descriptions thereof will be omitted herein.

Figure 22:
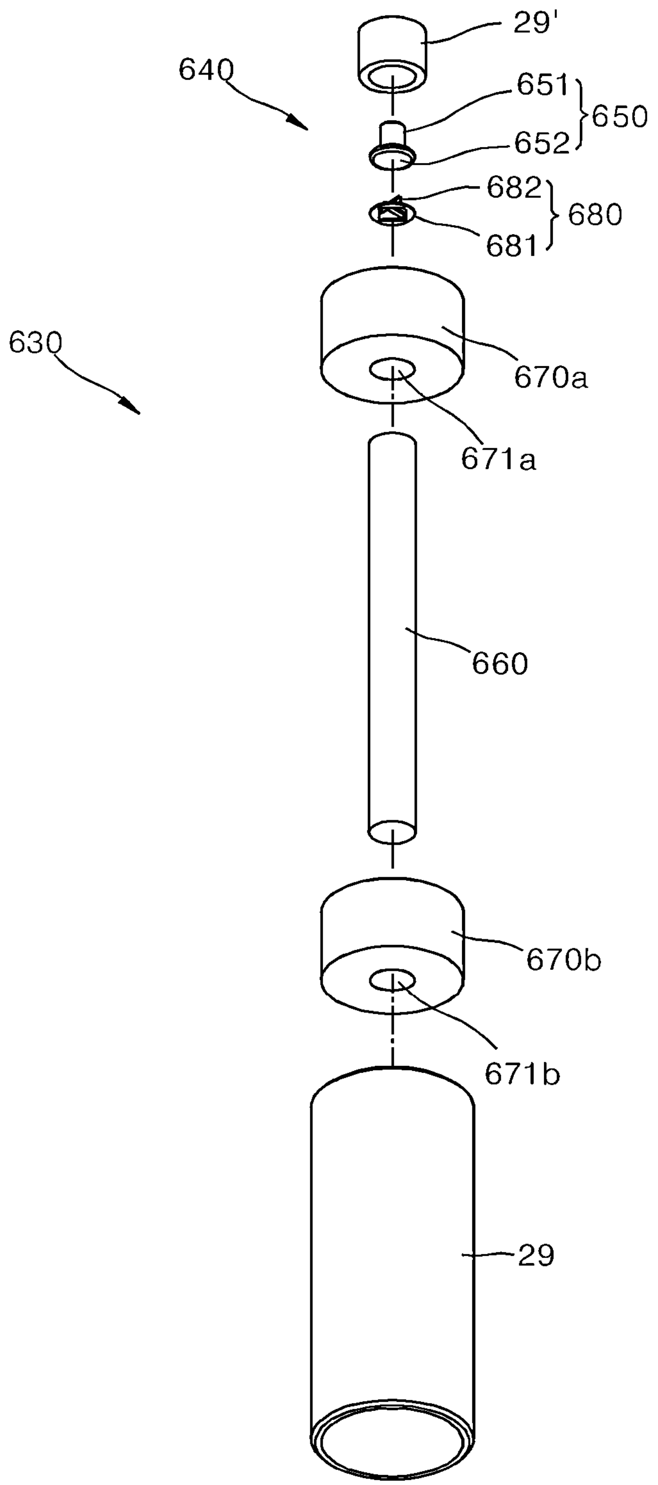
FIG. 22 is an exploded perspective view illustrating a cavity filter in accordance with a seventh embodiment of the present disclosure.
Figure 23:
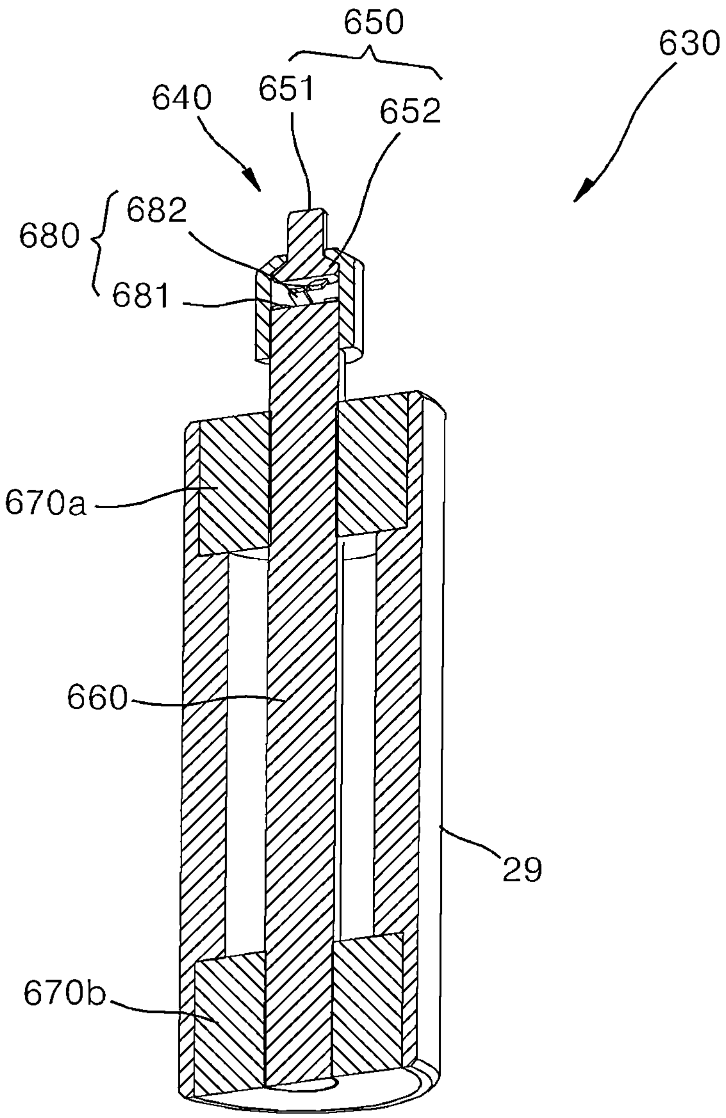
FIG. 23 is a cross-sectional view illustrating the cavity filter in accordance with the seventh embodiment of the present disclosure.
Figure 24:
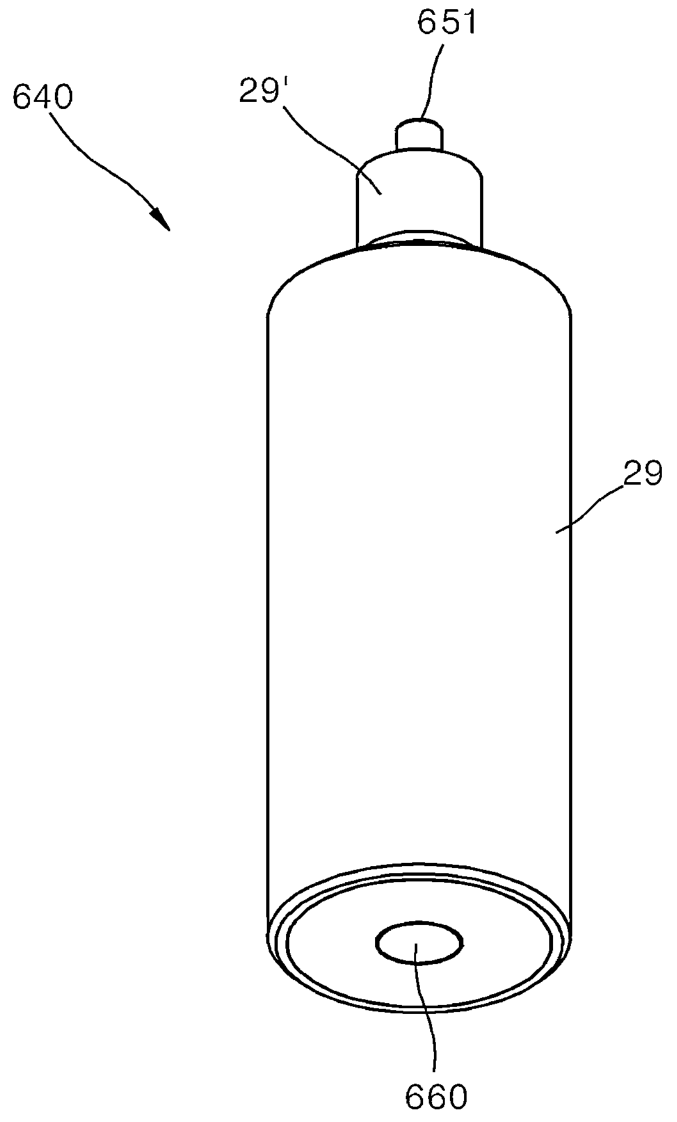
FIG. 24 is a perspective view illustrating a terminal portion among components of FIG. 22.

FIG. 22 is an exploded perspective view illustrating some components of a cavity filter in accordance with a seventh embodiment of the present disclosure, FIG. 23 is a cross-sectional view illustrating that a terminal portion is inserted and installed into a terminal insertion port 25 (as shown in FIG. 4) among the components of FIG. 22, and FIG. 24 is a perspective view illustrating the terminal portion among the components of FIG. 22.

As illustrated in FIGS. 22 to 24, a cavity filter 630 (FIGS. 22 and 23) in accordance with the seventh embodiment of the present disclosure includes a terminal portion 640 and dielectric bodies *670a* and *670b* (FIGS. 22 and 23) disposed in a terminal insertion port 25 (FIG. 22).

The dielectric bodies *670a* and *670b* may have a shape for impedance matching in the terminal insertion port 25. As illustrated in FIG. 22, the dielectric bodies *670a* and *670b* may include upper and lower dielectric bodies *670a* and *670b* having terminal through-holes *671a* and *671b* through which upper and lower end portions of the second terminal 660 of the terminal portion 640, which will be described below, pass, respectively.

As illustrated in FIGS. 22 and 24, the cavity filter 630 in accordance with the seventh embodiment of the present disclosure may be disposed in the terminal insertion port 25, and include a main terminal housing 29 formed in a hollow pipe shape and a sub terminal housing 29' disposed over the main terminal housing 29 so as to be spaced apart from the main terminal housing 29.

Although not specifically illustrated in the drawings, the terminal insertion port may have a shape corresponding to the exterior shapes of the main terminal housing 29 and the sub terminal housing 29'.

The second terminal 660 may be disposed vertically through the main terminal housing 29, and disposed through the terminal through-holes *671a* and *671b* of the upper and lower dielectric bodies *670a* and *670b* provided in the main terminal housing 29.

Furthermore, a part of the upper end portion of the second terminal 660 disposed through the main terminal housing 29 may be inserted, by a predetermined distance, into the sub terminal housing 29'. In the sub terminal housing 29', a contact plate 652 (FIGS. 22 and 23) as a locking end formed at the bottom of the first terminal 650 (FIGS. 22 and 23) may be installed to prevent the first terminal 650 (FIGS. 22 and 23) from being separated to the outside, and an elastic member 680 (FIGS. 22 and 23) may be interposed between the first terminal 650 (FIGS. 22 and 23) and the second terminal 660 (FIGS. 22 and 23).

The first terminal 650 (FIGS. 22 and 23) may include a contact portion 651 and a contact plate 652. The contact portion 651 may be in contact with the electrode pad of an external device provided as any one of an antenna board and a PCB board, and the contact plate 652 may be formed to have a larger diameter than the outer diameter of the contact portion 651, and locked to the inside of the sub terminal housing 29'.

As illustrated in FIGS. 22 and 23, the elastic member 680 (FIGS. 22 and 23) may be provided as a bar spring which includes a support ring 681 and a pair of support bars 682. The support ring 681 may be supported by the top surface of the second terminal 660, and the pair of support bars 682 may protrude from the support ring 681 so as to be upward inclined in directions crossing each other, and support the bottom surface of the contact plate 652 of the first terminal 650.

As illustrated in FIG. 23, the bar spring may absorb assembly tolerance existing in the terminal insertion port 25 (as shown in FIG. 4) while compressed and deformed by the first terminal 650 which is pressed when an assembly force of an assembler is provided. Simultaneously, the bar spring may prevent disruption of an electric flow even though separate tension cut portions are not provided, because the bar spring is formed of a conductive material through which a current may flow.

The lower end portion of the second terminal 660 may be soldered to a solder hole 32 (as shown in FIG. 5) formed in the plate of the RF signal connecting portion provided in the terminal insertion port 25 (as shown in FIG. 4).

In the cavity filter 630 in accordance with the seventh embodiment of the present disclosure, which has the above-described configuration, the first terminal 650 of the terminal portion 640 may absorb assembly tolerance existing in the terminal insertion port 25 (as shown in FIG. 4) through an assembly force provided by an assembler, while elastically supported by the elastic member 680 in the sub terminal housing 29'.

Figure 25:
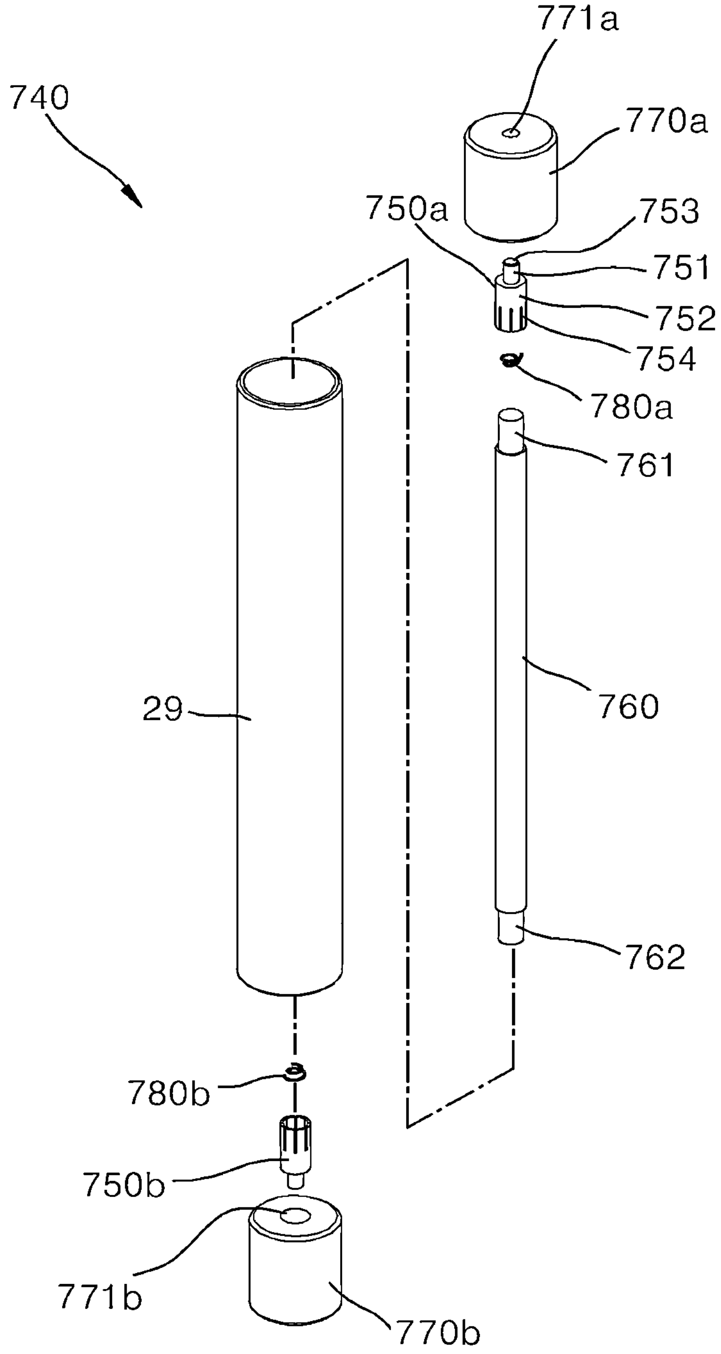
FIG. 25 is an exploded perspective view illustrating a cavity filter in accordance with an eighth embodiment of the present disclosure.
Figure 26:
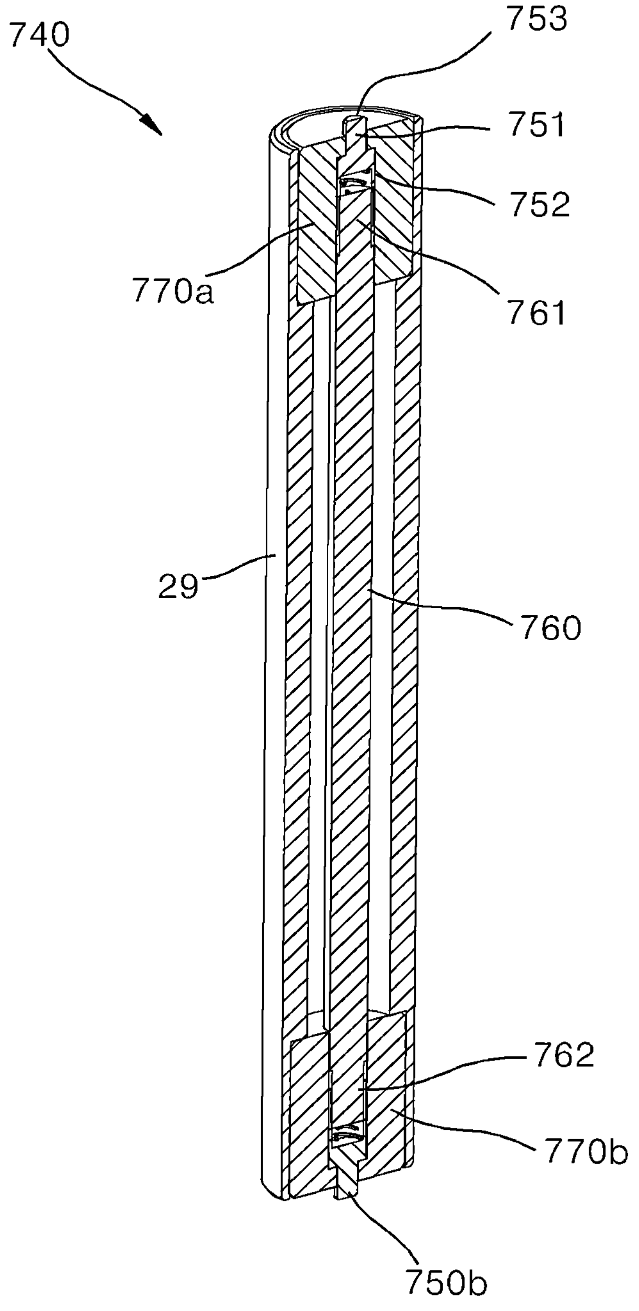
FIG. 26 is a cross-sectional view illustrating the cavity filter in accordance with the eighth embodiment of the present disclosure.
Figure 27:
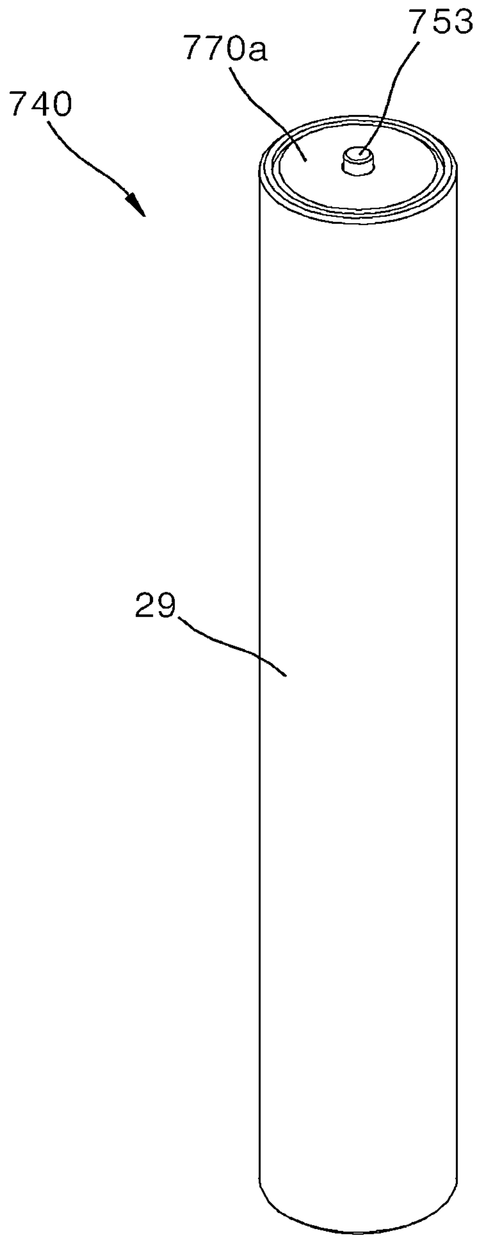
FIG. 27 is a perspective view illustrating a terminal portion among components of FIG. 25.

FIG. 25 is an exploded perspective view illustrating some components of a cavity filter in accordance with an eighth embodiment of the present disclosure, FIG. 26 is a cross-sectional view illustrating that a terminal portion is inserted and installed into a terminal insertion port among the components of FIG. 25, and FIG. 27 is a perspective view illustrating the terminal portion among the components of FIG. 25.

As illustrated in FIGS. 25 to 27, a cavity filter in accordance with the eighth embodiment of the present disclosure includes a terminal portion 740 (FIGS. 25 to 27) and dielectric bodies *770a* (FIGS. 25 to 27) and *770b* (FIGS. 25 and 26) disposed in a terminal insertion port 25.

As illustrated in FIG. 26, the dielectric bodies *770a* (FIGS. 25 to 27) and *770b* (FIGS. 25 and 26) may each have a shape for impedance matching in the terminal insertion port 25, and include upper and lower dielectric bodies *770a* (FIGS. 25 to 27) and *770b* (FIGS. 25 and 26) having terminal through-holes *771a* (FIG. 25) and *771b* (FIG. 25) through which an upper end portion of the first terminal *750a* (FIG. 25) and a lower end portion of the second terminal *750b* (FIGS. 25 and 26) in the terminal portion 740 (FIGS. 25 to 27), which will be described below, respectively.

As illustrated in FIGS. 25 to 27, the cavity filter in accordance with the eighth embodiment of the present disclosure may include a terminal housing 29 disposed in the terminal insertion port 25 and formed in a hollow pipe shape and a transfer terminal 760 (FIGS. 25 and 26) disposed in the center of the terminal housing 29 and elongated in the longitudinal direction thereof.

Although not specifically illustrated, the terminal insertion port 25 may be formed in a bar shape corresponding to the exterior shape of the terminal housing 29.

The transfer terminal 760 may have an upper end portion 761 and a lower end portion 762 as shown in FIGS. 25 and 26. The upper end portion 761 may be partially inserted into the terminal through-hole *771a* of the upper dielectric body 770*a*, and the lower end portion 762 may be partially inserted into the terminal through-hole 771*b* of the lower dielectric body 770*b*.

As illustrated in FIGS. 25 and 26, the terminal portion 740 in the cavity filter in accordance with the eighth embodiment of the present disclosure may include the first terminal 750*a* and the second terminal 750*b* (FIG. 25). The first terminal 750*a* may be disposed in the terminal through-hole 771*a* of the upper dielectric body 770*a*, spaced apart from the upper end portion 761 of the transfer terminal 760, and fixedly locked so as not to be separated from the upper dielectric body 770*a*. The second terminal 750*b* may be disposed in the terminal through-hole 771*b* of the lower dielectric body 770*b*, spaced apart from the lower end portion 762 of the transfer terminal 760, and fixedly locked so as not to be separated from the lower dielectric body 770*b* as shown in FIG. 25.

Furthermore, the cavity filter in accordance with the eighth embodiment of the present disclosure may include an upper elastic member 780*a* and a lower elastic member 780*b* (as shown in FIG. 25), which are interposed between the upper dielectric body 770*a* and the lower dielectric body 770*b*. The upper elastic member 780*a* may be interposed between the first terminal 750*a* and the upper end portion 761 of the transfer terminal 760, and the lower elastic member 780*b* may be interposed between the second terminal 750*b* and the lower end portion 762 of the transfer terminal 760.

Both of the upper elastic member 780*a* and the lower elastic member 780*b* may be provided as springs.

As illustrated in FIG. 25, the upper elastic member 780*a* and the lower elastic member 780*b* may serve to absorb assembly tolerance existing in the terminal insertion port 25 while compressed and deformed by the first terminal 750*a* which is pressed when an assembly force of an assembler is provided.

As illustrated in FIG. 26, the cavity filter in accordance with the eighth embodiment of the present disclosure may have tension cut portions 754 formed in a lower end portion 752 of the first terminal 750*a* and an upper end portion of the second terminal 750*b*, in which the upper and lower end portions 761 and 762 of the transfer terminal 760 are inserted and housed.

The outer circumferential surfaces of the tension cut portions 754 may be in contact with the upper dielectric body 770*a* and the lower dielectric body 770*b* and supported by the upper dielectric body 770*a* and the lower dielectric body 770*b*, thereby providing lateral tension. Therefore, it is possible to prevent disruption of the electric flow between the first terminal 750*a* and the transfer terminal 760 and between the second terminal 750*b* and the transfer terminal 760.

For example, the components with reference numerals 751, 752 and 753 perform a same or similar functions as that of 251, 252 and 253, respectively, and the detailed descriptions thereof will be omitted herein.

Figure 28:
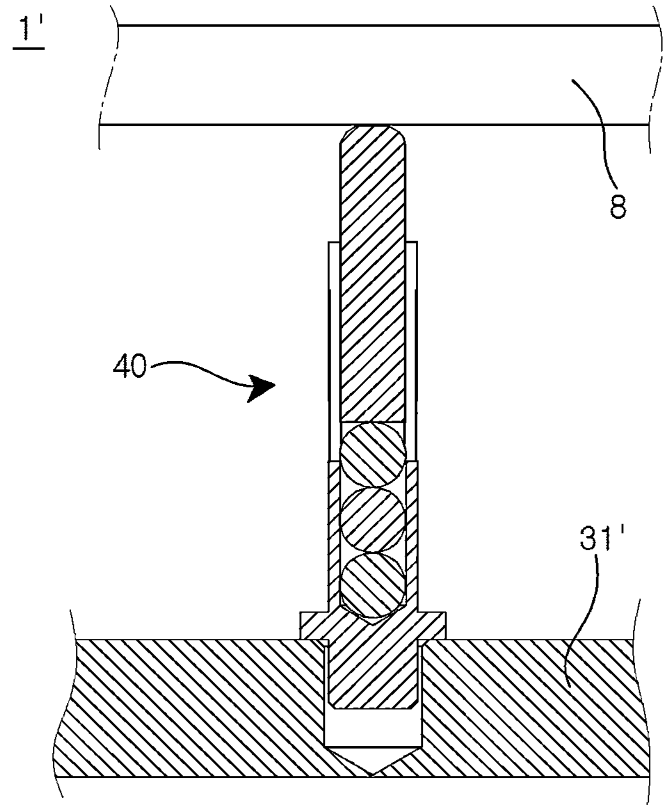
FIG. 28 is a cross-sectional view illustrating a connecting structure in accordance with an embodiment of the present disclosure.

FIG. 28 is a cross-sectional view illustrating a connecting structure in accordance with an embodiment of the present disclosure.

It has been described that each of the cavity filters in accordance with the various embodiments of the present disclosure, which have been described so far, is fabricated as one module and attached to one surface of the external device 8 configured as any one of an antenna board and a PCB board. However, the embodiments of the present disclosure are not necessarily limited thereto. According to a modification illustrated in FIG. 28, the cavity filter may be implemented as a connection structure 1' having the terminal portion 40 which is provided between the electrode pad provided on one surface of the external device and another connection member 31', and makes an electric connection with the connection member 31', regardless of whether the cavity filter is fabricated in the form of a module.

The above-described contents are only exemplary descriptions of the technical idea of the present disclosure, and those skilled in the art to which the present disclosure pertains may change and modify the present disclosure in various manners without departing from the essential properties of the present disclosure.

Therefore, the embodiments disclosed in the present disclosure do not limit but describe the technical idea of the present disclosure, and the scope of the technical idea of the present disclosure is not limited by the embodiments. The scope of the protection of the present disclosure should be construed by the following claims, and all technical ideas within a range equivalent to the claims should be construed as being included in the scope of rights of the present disclosure.

INDUSTRIAL APPLICABILITY

The present disclosure provides a cavity filter which can have a slimmer and more compact structure because an RF connector is embedded in the filter body in the thickness direction thereof, be assembled through an assembly method capable of minimizing the accumulated assembly tolerance which occurs when a plurality of filters are assembled, facilitate the RF signal connection structure to be easily mounted and uniformly maintain the frequency characteristics of the filters, and provide stable connection by applying a lateral tension while allowing a relative motion, thereby preventing degradation in antenna performance, and a connecting structure included therein.

What is claimed is:

1. A cavity filter comprising:

an RF signal connecting portion;

a terminal portion situated in a terminal insertion port of the cavity filter, wherein the terminal portion includes:

a first conductive terminal in contact with an electrode pad of an external device, the external device spaced apart from the RF signal connecting portion; and a second conductive terminal in contact with the RF signal connecting portion;

wherein an upper portion of the second conductive terminal has a hollow space, and a part of a lower portion of the first conductive terminal is configured to be slidably inserted into the hollow space of the second conductive terminal.

2. The cavity filter of claim 1, further comprising:

an elastic member positioned in the hollow space of the second conductive terminal below a bottom of the first conductive terminal, wherein the elastic member is configured to be in contact with the bottom of the first conductive terminal and in contact with a bottom of the hollow space of the second conductive terminal.

3. The cavity filter of claim 2, wherein the hollow space of the second conductive terminal is formed in a hollow pipe shape, and the elastic member comprises two or more elastic beads which are formed to have a diameter corresponding to an inner diameter of the hollow space of the second conductive terminal.

4. The cavity filter of claim 2, wherein the hollow space of the second conductive terminal is formed in a hollow pipe shape, and the elastic member comprises a spring which has a diameter corresponding to an inner diameter of the hollow space of the second conductive terminal.

5. The cavity filter of claim 1, further comprising:

a dielectric body within the terminal insertion port, surrounding an exterior of the terminal portion exterior, wherein the first conductive terminal is configured to move with the dielectric body via an assembly force.

6. The cavity filter of claim 5, wherein:

the dielectric body includes:

an upper cylindrical portion with a first diameter; and a lower cylindrical portion with a second diameter smaller than the first diameter, the terminal portion comprises a through hole having a first portion corresponding to the upper cylindrical portion of the dielectric body and a second portion corresponding to the lower cylindrical portion of the dielectric body, wherein the second portion of the through hole has a larger diameter than the second diameter of the lower cylindrical portion but a smaller diameter than the first diameter of the upper cylindrical portion so that an upper surface of the first portion of the through hole is configured to support a bottom surface of the upper cylindrical portion of the dielectric body while the second portion of the dielectric body penetrates the second portion of the through hole.

7. The cavity filter of claim 6, further comprising:

a reinforcement plate provided between the upper surface of the second portion of the through hole and the bottom surface of the upper cylindrical portion of the dielectric body.

8. The cavity filter of claim 7, wherein the reinforcement plate is fixed to an insertion slot support, protruding into the terminal insertion port from a body of the cavity filter.

9. The cavity filter of claim 1, wherein the upper portion of the second conductive terminal includes a plurality of tension cut portions extending upward.

10. The cavity filter of claim 1, wherein the second conductive terminal includes an elastic ring installation groove on its outer surface, and at least one elastic ring is positioned in the groove.

11. A cavity filter comprising:

an RF signal connecting portion;

a terminal portion situated in a terminal insertion port of the cavity filter, wherein the terminal portion includes:

a first conductive terminal in contact with an electrode pad of an external device, the external device spaced apart from the RF signal connecting portion; and a second conductive terminal in contact with the RF signal connecting portion;

wherein a lower portion of the first conductive terminal has a hollow space, and a part of an upper portion of the second conductive terminal is configured to be slidably inserted into the hollow space of the first conductive terminal.

12. The cavity filter of claim 11, further comprising:

an elastic member positioned in the hollow space of the first conductive terminal above a top of the second conductive terminal, wherein the elastic member is configured to be in contact with the top of the second conductive terminal and in contact with a top of the hollow space of the first conductive terminal.

13. The cavity filter of claim 12, wherein the hollow space of the first conductive terminal is formed in a hollow pipe shape, and the elastic member comprises two or more elastic beads which are formed to have a diameter corresponding to an inner diameter of the hollow space of the first conductive terminal.

14. The cavity filter of claim 12, wherein the hollow space of the first conductive terminal is formed in a hollow pipe shape, and the elastic member comprises a spring which has a diameter corresponding to an inner diameter of the hollow space of the first conductive terminal.

15. The cavity filter of claim 11, further comprising:

a dielectric body within the terminal insertion port, surrounding an exterior of the terminal portion exterior, wherein the first conductive terminal is configured to move with the dielectric body via an assembly force.

16. The cavity filter of claim 15, wherein:

the dielectric body includes:

an upper cylindrical portion with a first diameter; and a lower cylindrical portion with a second diameter smaller than the first diameter, the terminal portion comprises a through hole having a first portion corresponding to the upper cylindrical portion of the dielectric body and a second portion corresponding to the lower cylindrical portion of the dielectric body, wherein the second portion of the through hole has a larger diameter than the second diameter of the lower cylindrical portion but a smaller diameter than the first diameter of the upper cylindrical portion so that an upper surface of the first portion of the through hole is configured to support a bottom surface of the upper cylindrical portion of the dielectric body while the second portion of the dielectric body penetrates the second portion of the through hole.

17. The cavity filter of claim 16, further comprising:

a reinforcement plate provided between the upper surface of the second portion of the through hole and the bottom surface of the upper cylindrical portion of the dielectric body.

18. The cavity filter of claim 17, wherein the reinforcement plate is fixed to an insertion slot support, protruding into the terminal insertion port from a body of the cavity filter.

19. The cavity filter of claim 11, wherein the lower portion of the first conductive terminal includes a plurality of tension cut portions extending upward.

20. The cavity filter of claim 11, wherein the first conductive terminal includes an elastic ring installation groove on its outer surface, and at least one elastic ring is positioned in the groove.

* * * * *